United States Patent [19]
Bates et al.

[11] Patent Number: 6,072,490
[45] Date of Patent: Jun. 6, 2000

[54] MULTI-NODE USER INTERFACE COMPONENT AND METHOD THEREOF FOR USE IN ACCESSING A PLURALITY OF LINKED RECORDS

[75] Inventors: Cary Lee Bates; Paul Reuben Day, both of Rochester, Minn.

[73] Assignee: International Business Machines Corporation, Armonk, N.Y.

[21] Appl. No.: 09/227,803

[22] Filed: Jan. 8, 1999

Related U.S. Application Data

[62] Division of application No. 08/912,258, Aug. 15, 1997, Pat. No. 5,877,766.
[51] Int. Cl.[7] ............................................... G06F 3/14
[52] U.S. Cl. ........................ 345/347; 707/512; 345/357
[58] Field of Search .................................. 345/356, 357, 345/339, 347; 707/512

[56] References Cited

U.S. PATENT DOCUMENTS

| | | | |
|---|---|---|---|
| 5,526,478 | 6/1996 | Russell, Jr. et al. | 395/154 |
| 5,559,942 | 9/1996 | Gough et al. | 395/155 |
| 5,644,740 | 7/1997 | Kiuchi | 395/357 |
| 5,726,687 | 3/1998 | Belfiore et al. | 345/341 |
| 5,739,821 | 4/1998 | Ho et al. | 345/340 |
| 5,745,737 | 4/1998 | Kayes et al. | 395/500 |
| 5,754,161 | 5/1998 | Noguchi et al. | 345/123 |
| 5,878,223 | 3/1999 | Becker et al. | 395/200.53 |

OTHER PUBLICATIONS

Gartner, "Microsoft IE 4.0 Meets the Press", *TechWire Website*, Jun. 24, 1997.

"Anawave WebSnake Tutorial—Home", http://www.websnake.com, downloaded May 21, 1997.

"Anawave WebSnake Tutorial—Mirroring", http://www.websnake.com/snakemirroring.html, downloaded May 21, 1997.

"Windows 95.com Offline Browser Tools", http://www.windows95.com/apps/offline.html, downloaded May 21, 1997.

(List continued on next page.)

*Primary Examiner*—Raymond J. Bayerl
*Assistant Examiner*—C. Jackson
*Attorney, Agent, or Firm*—Wood, Herron & Evans, L.L.P.

[57] ABSTRACT

A user interface component and method of using the same graphically display linked records with node display elements representing individual records, and optional link display elements representing the links therebetween. The user interface component may be automatically and dynamically generated during navigation between linked records, such that whenever a new link is taken from a record represented by a node display element, a new node display element is generated. In addition, the user interface component may further be configured to graphically represent the particular location of a particular link within a record, as well as a scroll display element associated with selected node display elements such that specific data or locations within the records associated therewith may be accessed. Moreover, the user interface component may also be configured to incorporate a retrieve progress display element that indicates a current status of a retrieve operation for a record. Individual node display elements within a user interface component may also separately indicate status information for their associated records, e.g., displaying a cache status and/or a matching status that indicates whether associated records match a predetermined search criteria, among others. The user interface component may also be utilized to perform common operations such as printing, caching and loading, among others, on selected records in response to user selection of the nodes associated with the selected records.

35 Claims, 23 Drawing Sheets

OTHER PUBLICATIONS

"SiteHog—The Web Site Validation Tool", http://www.compulink.co.uk/~allied–display/redhog/sitehog.html, downloaded May 21, 1997.

"What is WebWilly", http://www.webwilly.com/power/game2.shtml, downloaded May 21, 1997.

"Microsoft® FrontPage 97 with Bonus Pack", http://www.microsoft.com/frontpage/brochure/features.hum, downloaded May 21, 1997.

Cowart, Robert, *Mastering Windows™ 3.1*, Special Edition, Sybeck, (1993) pp. 105–140.

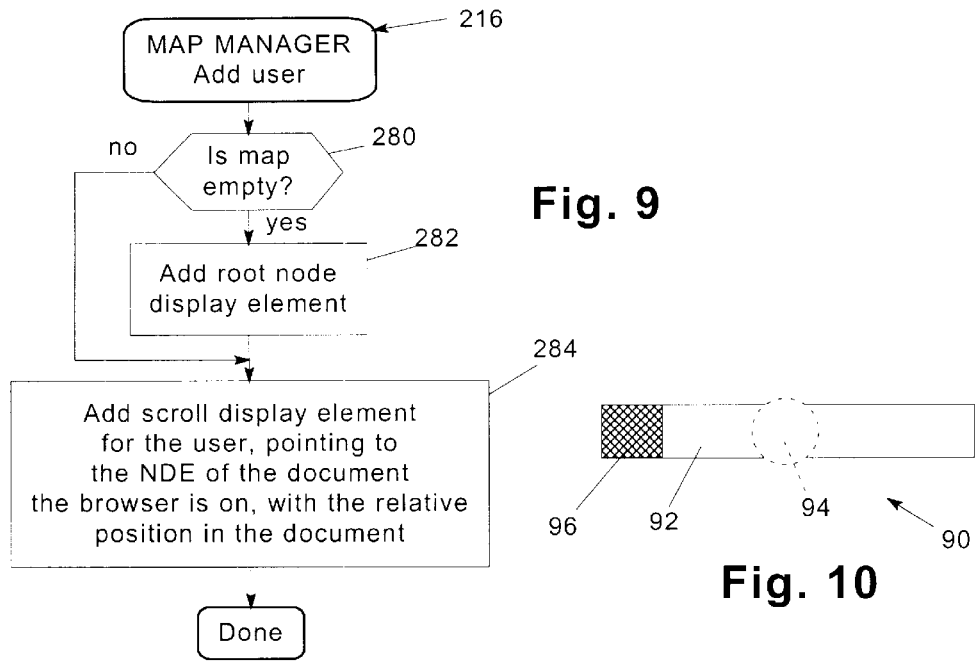
Fig. 9
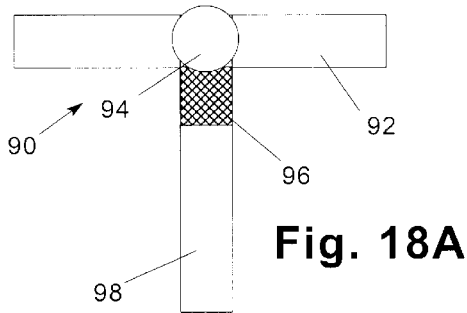
Fig. 10
Fig. 18A
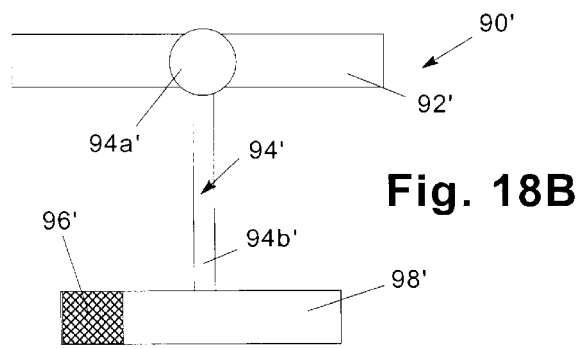
Fig. 18B

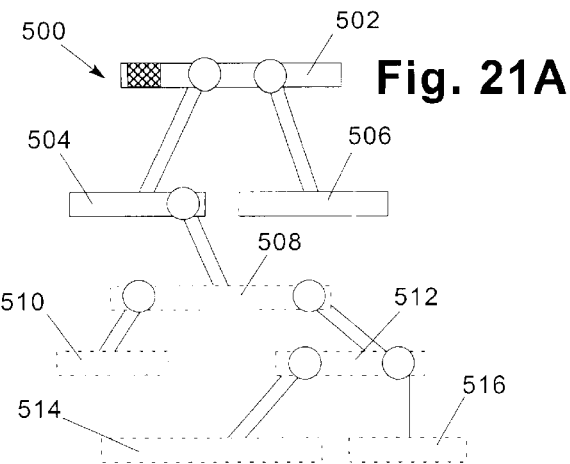
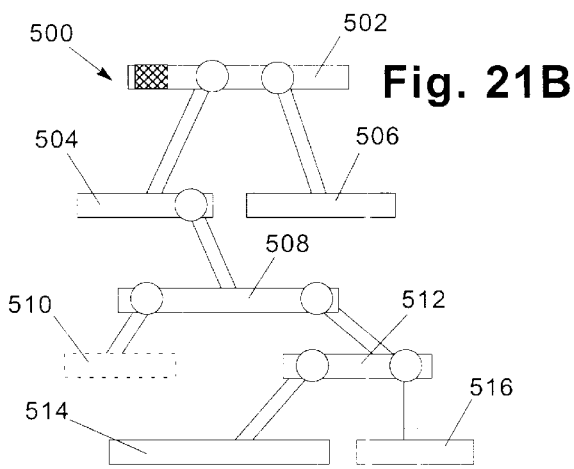
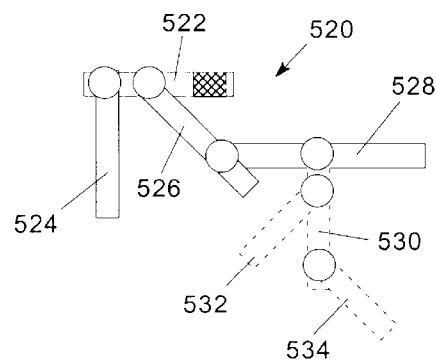
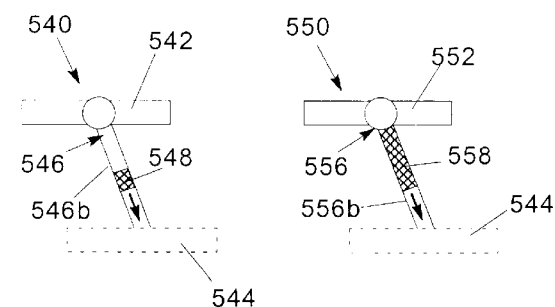
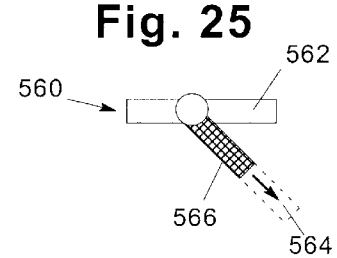
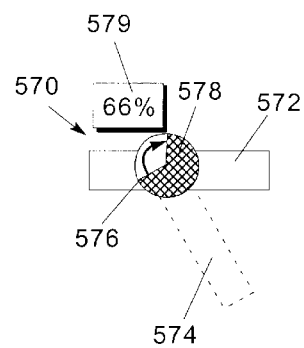

MULTI-NODE USER INTERFACE COMPONENT AND METHOD THEREOF FOR USE IN ACCESSING A PLURALITY OF LINKED RECORDS

CROSS-REFERENCE TO RELATED APPLICATIONS

This application is a divisional application of U.S. Ser. No. 08/912,258, filed on Aug. 15, 1997 U.S. Pat. No. 5,877,766 by Bates et al., entitled "MULTI-NODE USER INTERFACE COMPONENT AND METHOD THEREOF FOR USE IN ACCESSING A PLURALITY OF LINKED RECORDS", which application is incorporated by reference herein. The above-identified application is related to a co-pending patent application filed on even date herewith by the above-identified inventors, U.S. patent application Ser. No. 08/912,030 and entitled "USER INTERFACE COMPONENT AND METHOD OF NAVIGATING ACROSS A BOUNDARY COUPLED TO A SCROLL BAR DISPLAY ELEMENT", which application is incorporated by reference herein.

FIELD OF THE INVENTION

The invention is generally related to computers and computer software for use therewith, and more particularly, to user interface components for permitting user access to data stored in a computer.

BACKGROUND OF THE INVENTION

As computers have become more complex and powerful, the manner in which end users or operators interface with computers has grown increasingly important. Early computers relied on switches, lights, and/or punch cards that required an end user to interact essentially in the computers' native binary languages. Eventually, video displays were developed that enabled end users to interact with computers through textual information and commands. Another significant step in this evolution was the development of graphical user interfaces (GUIs), which permitted end users to interact with computers through the more intuitive operations of "pointing and clicking" on graphical display elements with a pointer controlled by a mouse or other user interface device. For example, to print a file, an end user in a text-based system might be required to enter a command such as "print <filename>". With a graphical user interface, a similar operation might be accomplished by merely moving a pointer with a mouse and clicking on an graphical icon showing a graphic representation of a printer.

Information is often presented to an end user in a graphical user interface component known as a window. A window may include any number of controls or handles that an end user can point and click on to perform different operations. For example, a title bar is often provided at the top of a window to identify the application the window is associated with. A window may also include resizing handles along its boundaries that a user can grab with the pointer to change the size of the window. A menu bar on a window may include multiple pull-down menus that a user can select to perform specific functions listed in the menus.

A window may be used to display a relatively large document with only a portion of the document shown at any given time. Scroll bars on the window may then be used to navigate through the document—that is, to scroll through the information in a document so that a different portion of the document is displayed in the window. A scroll bar itself has a number of controls. For example, an end user may control a slider (or puck) on a scroll bar by clicking and holding down a mouse button over the slider, and then moving the pointer to scroll to a specific location in the document. An end user may also click on arrow buttons found at each end of a scroll bar to scroll a document line-by-line. Also, an end user may click on regions in the scroll bar between the slider and the buttons to scroll the document page-by-page or screen-by-screen.

A principal use of windowing technology is in accessing data stored in a computer. For example, data may be organized into records or files that are linked together in a predetermined manner. Accessing such data in an efficient manner is often problematic.

Data is often stored in files that are stored within various directories organized into a hierarchical directory tree. A number of graphical user interfaces represent directories using folder icons that an end user can click on to view the files and/or sub-directories contained within a given directory.

A directory tree typically can be used to reach any directory and/or file available to a computer. When the directories and files are all stored locally (e.g., on a hard or floppy disk drive), a directory tree may be an efficient manner of accessing data. However, data may also be stored outside of a computer, e.g., on a private network such as a local area network (LAN) or wide area network (WAN), and/or on a public network such as the Internet. The amount of data stored on these additional sources is often too substantial for access with a conventional directory tree, as thousands of files and directories may be represented in a given tree. An end user may have to manually dig through several levels of directories to find a particular file. An end user may also be able to use a search engine to find possible directories for a file; however, several directories may nonetheless need to be viewed before the desired data is found.

Another manner of accessing data is through the use of embedded links. For example, on a segment of the Internet known as the World Wide Web, information is organized into hypertext documents having embedded hypertext links that an end user can click on to either jump to different documents, or to jump to different locations within the same document. A wide variety of information formats such as text, graphics, video, sound, and animation may be integrated into these hypertext documents. The World Wide Web has enjoyed such immense popularity that many private networks now also support hypertext documents, as do a number of existing computer operating systems and computer software applications.

A computer software application, often referred to as a browser, is typically used to navigate between and through hypertext documents. With a browser, an end user can point and click on links such as highlighted text, images or other user interface components (e.g., buttons) in documents to navigate to different documents and/or to different locations within the same document. With the vast amount of information available to an end user, however, it is quite easy to lose one's place after navigating through several links.

Unlike an end user's local files, hypertext documents often cannot be organized hierarchically into directories that descend from a common root. For example, a document may be linked to multiple documents that are completely unrelated to one another, and which may be stored on different computers that are located on the opposite side of the world from one another. Consequently, conventional directory trees are not well suited for maintaining one's place during browsing.

Many browsers maintain a history of navigated locations to enable an end user to backtrack through several links, e.g., by clicking on a "back" button. Revisiting backtracked links may be performed using a "forward" button. In addition, an end user may save favorite locations as "bookmarks", which may themselves be organized into user-specified folders. An end user often can later access bookmarked locations merely by selecting a bookmark from a menu.

Nevertheless, neither history nor bookmark information typically provides a full picture or map of the various documents and locations that an end user has traversed while browsing. For example, when an end user navigates through several links from a particular document, backtracks to the original document using a back button, and then selects another link within that original document, the previous links navigated from the original document typically can no longer be retrieved using the "forward" button of the browser. Documents retrieved previously from the Internet or another network may be stored locally in a cache to speed repeat access, but once the history information for forward links is lost, the underlying documents are often only retrievable through manual searching of the computer cache.

Also, bookmarking locations is typically a manually-performed activity, whereby an end user specifically stores and organizes favorite sites as he or she sees fit. Bookmarking is therefore time consuming and fully dependent on end users. Unless an end user takes the extra time to bookmark every visited location, a complete map or history of navigated locations often cannot be maintained.

History and bookmark information are also not well suited to navigating within particular documents. While some documents may include internal hypertext links that point to different locations within the same documents, history and bookmark information permits navigation within such documents only to the particular locations specified by the internal hypertext links. Instead, separate mechanisms such as scroll bars must be used as the principal mechanisms for navigating to particular locations within documents. Consequently, an end user is often forced to consciously click on different objects in a graphical user interface depending upon whether the end user wishes to navigate between documents or to navigate within documents. As a result, navigation with this type of user interface is slow and burdensome for many end users.

Therefore, a significant need exists for a manner of organizing and enhancing access to hypertext documents and the like. Moreover, a significant need exists for a manner of enhancing navigation between and within such documents.

SUMMARY OF THE INVENTION

The invention addresses these and other problems associated with the prior art in providing a unique user display and method of using the same in which linked records are graphically displayed with node display elements representing individual records, and link display elements representing the links therebetween. One particular application deriving unique benefit from the invention is in that of navigating hypertext documents, whether stored locally, on a private network, and/or on the Internet or other public network. However, it should be appreciated that the invention may benefit other applications that utilize linked records consistent with the invention.

Consistent with one aspect of the invention, a user interface component may be configured to incorporate a scroll display element associated with a selected node display element to access specific data or locations within the record associated therewith. In this manner, navigation within records and navigation between records is integrated into a common user interface to speed as well as to simplify access to the data within the records.

Consistent with a farther aspect of the invention, other control elements in addition to or in lieu of a scroll display element may be utilized on a selected node display element to facilitate navigation within the record associated therewith.

Consistent with another aspect of the invention, a user interface component may further be configured to graphically represent the particular location of a particular link within a record. This additional information enables an end user to quickly ascertain the relative location of a link within a record.

Consistent with yet another aspect of the invention, individual node display elements within a user interface component may separately indicate status information for their associated records. For example, a cache status may be indicated in individual node display elements to indicate whether the associated records are currently stored in a computer's memory.

Consistent with an additional aspect of the invention, a user interface component may also be configured to incorporate a retrieve progress display element that indicates a current status of a retrieve operation for a record. By graphically associating the retrieve progress display element with a node and/or link display element, the status of a retrieve operation may be easily and quickly ascertained.

Consistent with yet another aspect of the invention, other status information may be indicated within a user interface component. For example, a matching status may be indicated in individual node display elements to indicate whether the associated records match a predetermined search criteria.

Consistent with a further aspect of the invention, a user interface component may also be utilized to perform common operations on selected records in response to user selection of the nodes associated with the selected records. Customized groupings of records may therefore be jointly operated upon through a highly efficient user interface.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWINGS

FIG. 9 is a flowchart illustrating the program flow of the add user routine shown in FIG. 7.

FIG. 10 is a block diagram of an exemplary map display after initialization thereof.

FIGS. 18A and 18B are block diagrams of exemplary adjoining-type and non-adjoining-type map displays, respectively, after addition of a node display element.

FIGS. 21A and 21B are block diagrams of exemplary non-adjoining-type map displays illustrating cache status indicators on the node display elements, respectively before and after retrieval of documents associated with selected node display elements.

FIG. 22 is a block diagram of an exemplary adjoining-type map display illustrating cache status indicators on the node display elements.

FIG. 23 is a block diagram of an exemplary non-adjoining-type map display with one suitable retrieve progress display element displayed therein.

FIG. 24 is a block diagram of an exemplary non-adjoining-type map display with an alternate retrieve progress display element to that shown in FIG. 23.

FIG. 25 is a block diagram of an exemplary adjoining-type map display with one suitable retrieve progress display element displayed therein.

FIG. 26 is a block diagram of an exemplary adjoining-type map display with an alternate retrieve progress display element to that shown in FIG. 25.

DETAILED DESCRIPTION

Figure 1:
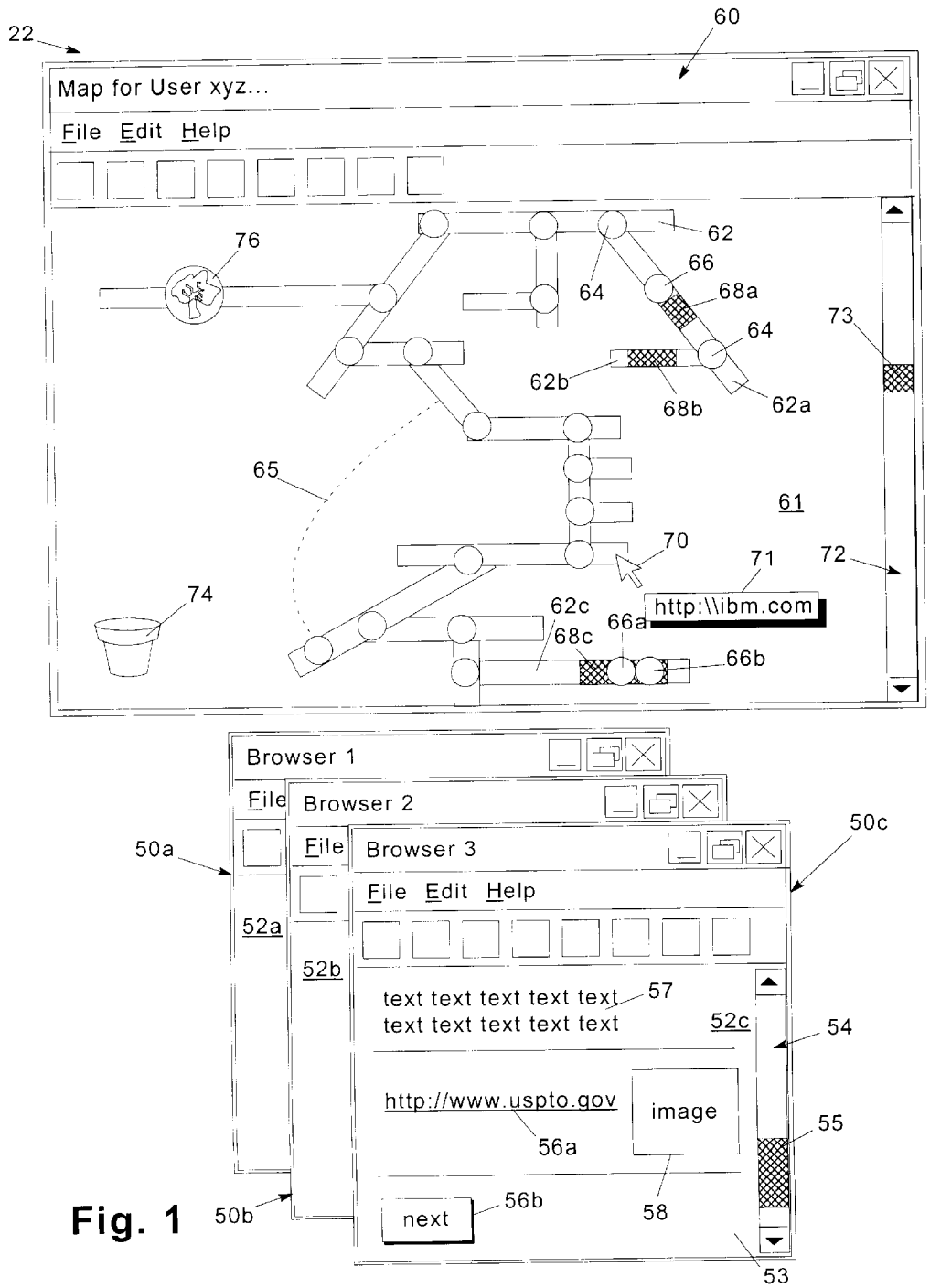
FIG. 1 is a block diagram of a representative computer display upon which is illustrated a user interface component consistent with the principles of the present invention.

The various embodiments of the invention principally provide a unique user interface component to graphically represent a data structure having a plurality of linked records. The user interface component, which is referred to below as a map display component, or simply a map display, utilizes a map data structure, or map, with a plurality of node display elements (NDE's) to represent individual records that are graphically linked to one another. In addition, a plurality of link display elements (LDE's) in the map data structure may be utilized to represent the links between such node display elements.

One application of a map display is in navigating hypertext documents stored locally on an end user's computer, on a private network such as a local area network (LAN) or wide area network (WAN), and/or on the Internet or other public network. Consequently, in such an application, the node display elements typically represent hypertext documents, while the link display elements typically represent the actual hypertext links between such documents. The hypertext documents may be, for example, in hypertext markup language (HTML) format, and may include text as well as various multimedia objects such as static and/or moving images, sounds, animations, etc. Further, the hypertext documents may include executable objects such as Java applets, controls such as Java Beans and Active X controls, scripts such as Javascript scripts, etc. The node display elements may represent only HTML-format documents, with any multimedia or executable objects contained therein considered to be part of the same documents. Alternatively, multimedia and/or executable objects may be embodied in separate node display elements, whereby the references to such objects in HTML-format documents would also operate as links and be embodied in separate link display elements.

While the disclosure shall hereinafter describe the use of map displays for representing and/or navigating linked hypertext documents, it should be appreciated that the invention may have benefit in other applications to access (e.g., view, store, modify, etc.) linked records consistent with the invention. For example, map displays consistent with the invention may be utilized to represent private databases, menuing systems, etc.

When used in conjunction with navigating hypertext documents, a map display is typically generated dynamically, whereby node display elements are automatically added to the map display as new links are taken by an end user. Consequently, the map displays may be used to provide a history, or "bread crumb trail" for an end user as he or she navigates through various records. Given the practically endless amount of content on the Internet, for example, the history provided by a map display may be invaluable.

Another display element that may be included in a map display is a scroll display element, also known as a "slider" or "puck", which enables node display elements to have additional functionality as scroll bars for navigating through the contents of their associated records. When a separate display such as a browser window is activated for displaying the contents of a given document, a slider disposed within a region of the associated node display element may be utilized to scroll the browser window through the contents of the document. Moreover, a slider may be utilized to navigate to different documents, e.g., by dragging the slider to another node display element, either by passing through adjacent elements (a "bounded" drag) or by dragging directly to the desired node display element (an "unbounded" drag). Through this arrangement, navigation within documents is integrated with navigation between documents, thereby greatly simplifying access thereto.

Furthermore, as will be discussed in greater detail below, each node display element may also be sized relative to other node display elements to indicate a relative size of its associated record. Moreover, link display elements may be positioned on node display elements at a relative location corresponding to the relative location of the link in the associated record, whereby the location of a link within a document may be readily ascertained.

Turning now to the Drawing, wherein like numbers denote like parts throughout the several views, FIG. 1 illustrates a representative computer display 22 upon which is illustrated one embodiment of a map display 60 consistent with the principles of the invention. Map display 60 includes a plurality of node display elements 62 graphically interconnected via a plurality of link display elements 64. In this embodiment, linked node display elements visually adjoin one another proximate the links therebetween, with the link display elements forming link markers, e.g., represented by circular pegs or similar indicators, disposed at the intersection of the node display elements. In the alternative, as illustrated by map display 80 in FIG. 2, node display elements 82 may be visually separated from one another and joined by link display elements 84. In this alternate embodiment, the link display elements 84 may include both a link marker, such as a circular peg 84a, that indicates the relative location of the link in the parent node display element, as well as a connector such as line segment 84b extending therefrom and terminating at the child node display element. In some embodiments, however, the link marker 84a may not be required.

Additional features, functions, and operations may be utilized in conjunction with map displays consistent with the invention. However, a discussion of such features shall be deferred pending a discussion of exemplary hardware and software environments in which such map displays may be implemented.

Exemplary Hardware Environment

Figure 3:
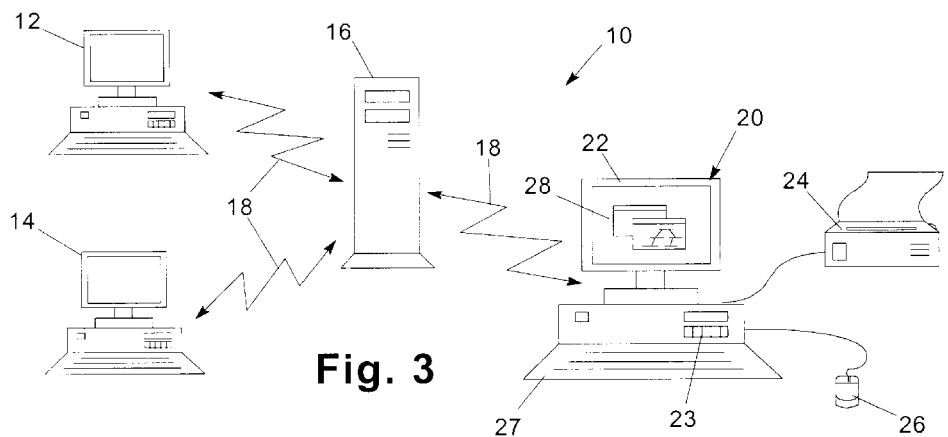
FIG. 3 is a block diagram of an exemplary hardware environment suitable for use with the various embodiments of the invention.

A representative hardware environment suitable for use with the illustrated embodiments of the invention is illustrated in FIG. 3, where a networked computer system 10 generally includes one or more computer systems, e.g., client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, typically includes a processor such as a microprocessor 21; a number of peripheral components such as computer display 22 (e.g., a CRT, an LCD display or other display device); hard, floppy, and/or CD-ROM disk drives 23; a printer 24; and various input devices (e.g., a mouse 26 and keyboard 27); among others. Computer system 20 operates under the control of an operating system 28, which is represented in FIG. 1 by the screen display on the display 22, as well as various computer software applications, programs, objects, modules, etc. Moreover, various applications, programs, objects, modules, etc. may also execute on one or more processors in server 16 or other computer systems 12, 14, e.g., in a distributed or groupware computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the present invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, and CD-ROM's, and transmission type media such as digital and analog communications links.

Those skilled in the art will recognize that the exemplary environment illustrated in FIG. 3 is not intended to limit the present invention. Indeed, those skilled in the art will recognize that other alternative hardware environments may be used without departing from the scope of the present invention.

Exemplary Software Environment

Figure 4:
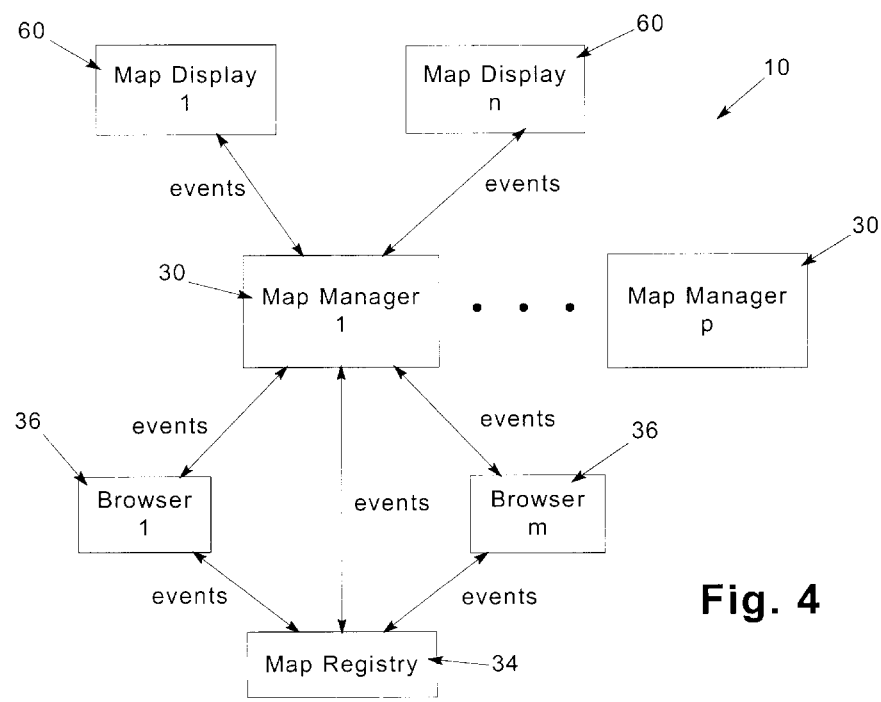
FIG. 4 is a block diagram of an exemplary software environment suitable for use with the various embodiments of the invention.

A representative software embodiment suitable for use with the illustrated embodiments of the invention is illustrated in FIG. 4, where networked computer system 10 includes a number of program modules distributed throughout various computers in the system in a groupware or distributed computer environment.

Map displays are implemented in network system 10 utilizing a number of modules or objects. One or more map managers 30 handle overall management of the mapping function for one or more clients, that is, client computer systems such as individual workstations. Typically, each client (1 . . . p) in a groupware environment is assigned a map manager 30 to handle an active map display 60 for that client. The map display 60 displays the data within a given map data structure to an end user. In certain embodiments, however, an end user may have the ability to open multiple map displays to display multiple map data structures simultaneously.

Each map manager 30 also utilizes a map registry 34 that maintains operational information regarding the active map displays 60. A browser, or browser window, may be considered to include any display component suitable for "browsing" or viewing the contents of a linked record. For example, a suitable browser may be based upon the Navigator web browser from Netscape Communications, or the Internet Explorer web browser from Microsoft. In addition, each browser 36 may be a separate application, or may be a separate window of a single application, as is well known in the art. Generally, a browser 36 is open for each active slider 1 . . . m on the active map display 60 for the client. Each browser open for a particular map display may be referred to as a "user" of the map display.

As illustrated in FIG. 4, networked computer system 10 is an event-driven object oriented programming system, whereby modules 30, 34, 36 and 60 interact via events or messages passed between the modules. It should be appreciated, however, that non-object oriented, as well as procedural or other non-event driven systems, may also be utilized to implement system 10.

In a groupware environment, the functionality of modules 30, 34, 36 and 60 may be separated between client and server computers. For example, modules 30 and 34 may be executed on a server computer to enable other clients to access the map displays of a given client, with map display 60 and browsers 36 implemented locally on an end user's client computer, such as a workstation or desktop system. In a mainframe or network computer environment, even the functionality of map display 60 and/or browsers 36 may be implemented within a server if desired.

Map displays consistent with the invention may have numerous uses in a groupware environment. For example, multiple users may be permitted to share map data structures, and even receive indication of where other user's currently are or have previously been in a given map. Individual icons for each user may be displayed on an end user's map display, or in the event that the number of users is too great, an indicator of the number of users that are currently or have been previously visiting given node display elements may be obtained (e.g., through alphanumeric, icon, pattern, or color indications). IS personnel may also be able to view a map, e.g., to monitor where end users visit most frequently. In general, the sharing of data in a groupware environment is well known in the art, and accordingly, the sharing of map displays among multiple users would be well within the skill of the ordinary artisan.

Nonetheless it should also be appreciated that the principles of the invention also apply to other computer systems whether or not in a groupware environment. For example, map displays may be utilized in single-user systems, e.g., a single desktop or portable computer coupled to the Internet over a dial-up connection, whereby only a single end user would be able to access a given map data structure. In such applications, it is envisioned that all of the requisite modules may be incorporated into a single computer software application such as a web browser application. In general, a wide variety of hardware and/or software environments may be utilized to implement map displays consistent with the invention, and thus, the invention should not be limited to any particular environments discussed herein.

Map Display Structure

Overview

Returning to FIG. 1, map display 60 is illustrated as a window-type component, although it should be appreciated that the map display may be implemented as a panel or other type of display container or component. For example, the map display may be represented by a separate frame or region of a browser window. It may also be desirable to utilize a window or similar component that permits the contents (here a plurality of node and link display elements) to extend beyond a viewable area 61 of the window, whereby one or more scroll bars, e.g., scroll bar 72 with slider 73, may be used to scroll horizontally and/or vertically to view other portions of the structure. This arrangement also enables an end user to select various magnifications of the window to vary the amount of the map display displayed in the window. Also, it should be appreciated that other conventional window functions, e.g., closing, resizing, minimizing, and maximizing of the window, may also be utilized in a manner well known in the art.

In this embodiment, link display elements 64 are represented by link markers implemented as circular pegs, located proximate to the relative location of the associated link in the parent node display element (the node display element for the document containing the link), from which a child node display element (the node display element for the document referred to by the link) extends. Further, linked node display elements are visually adjoining one another proximate to the associated link display element. It should be appreciated that link display elements 64 may take other forms than circles, e.g., squares, lines, rectangles, and other geometric shapes and/or icons. Moreover, in certain embodiments, separate link display elements may not be required, whereby the point of intersection or abutment between two node display elements provides the visual representation of the proximate location of a link.

It should also be appreciated that a child node display element may extend in practically any direction from the parent node display element, e.g., based upon aesthetic considerations, or alternatively, node display elements may be constrained to extend in only a few predetermined directions (e.g., 45 or 90 degree increments). Moreover, if the link in question specifies a particular location in the child node display element, the link display element may be disposed at that relative location in the child node display element. It should also be appreciated that links may be bi-directional, whereby each node display element coupled by a link may be considered both a parent and a child. For example, a "back" button on a browser may represent a return link to a previous document from which the link to the current document was taken. Links may also be internal to a hypertext document, e.g., to different headings or sections within the document, whereby such link display elements may not be linked to other node display elements.

Furthermore, additional link display elements, e.g., link display elements 66, may be displayed in map display 60 to represent links that have not yet been navigated. By selecting such links, e.g., via a mouse click, an end user may navigate to the document referenced by the associated link. In the alternate, only link display elements that have been navigated may be displayed, or display of non-navigated link display elements may be a user selectable option.

Node display elements are also illustrated having variable lengths representative of the relative sizes of their associated documents. It may be desirable to constrain the lengths of the node display elements between predetermined maximum and minimum lengths, or to utilize fixed-size elements in the alternative. Also, the relative lengths of the node display elements may be adjusted periodically based upon the addition of new node display elements to the map display during navigation. In the alternative, node display elements may have variable lengths to facilitate arrangement of the map display, and thus the lengths thereof may have no relation to the relative size of their associated records. Further, all node display elements may have the same length.

Figure 2:
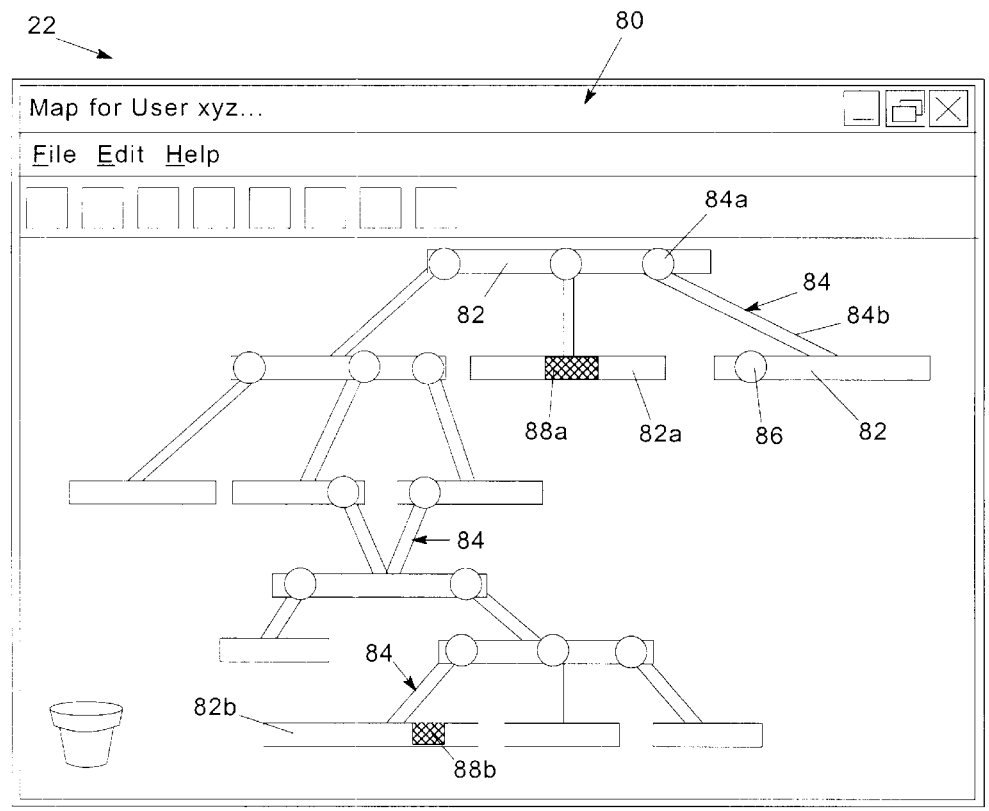
FIG. 2 is a block diagram of a representative computer display upon which is illustrated an alternate user interface component to that illustrated in FIG. 1.

As shown in FIG. 2, an alternate map display 80 may utilize link display elements 84 to link together visually separated node display elements 82. The map display illustrated in FIG. 2 will be referred to hereinafter as a "non-adjoining-type" map display, in contrast to the "adjoining-type" map display illustrated in FIG. 1.

In this alternate embodiment, the link display elements 84 may include both a link marker, such as a circular peg 84a, that indicates the relative location of the link in the parent node display element, as well as a connector such as line segment 84b extending therefrom and terminating at the child node display element. In some embodiments, however, the link marker 84a may not be required. Generally a connector in each link display element 84 may terminate proximate a mid-point of the referenced, or child node display element 82 for aesthetic concerns. However, if a particular link references a particular location in the referenced node display element, the connector may instead terminate at this location.

In the embodiment shown in FIG. 2, each node display element 82 is horizontally-oriented, with each node display element linked to a common node display element disposed along the same horizontal axis and sized according to the relative size of its associated document. However, it should be appreciated that it is not necessary for the node display elements to utilize a common orientation, be disposed on a common axis, or be variably sized, consistent with the invention.

It should also be understood that either of the representations shown in FIGS. 1 and 2 may be selected by an end user, e.g., by selecting "adjoining" or "non-adjoining" modes via a toolbar button, menu selection, keystroke, etc., as each representation may be better suited for different tasks. In the alternative, only one representation may be available for a given end user. Furthermore, it should be appreciated that the representations shown in FIGS. 1 and 2 are merely exemplary in nature, and that a number of other representations of a plurality of linked records or documents wherein node display elements are linked via link display elements may be used in the alternative.

Returning to FIG. 1, map display 60 also includes one or more sliders, e.g., sliders 68a, 68b, and 68c. Each slider is typically associated with an active window in which is displayed the contents of the document associated with the node display element in which the slider is located. For example, three browser windows 50a, 50b, 50c are illustrated in FIG. 1, with browser window 50a displaying the contents of the document 52a associated with node display element 62a, browser window 50b displaying the contents of the document 52b associated with node display element 62b, and browser window 50c displaying the contents of the document 52c associated with node display element 62c. Slider 68a may be used to navigate through the contents of the document displayed in browser window 50a, as may sliders 68b and 68c for the documents respectively displayed in browser windows 50b and 50c.

Moreover, as illustrated by slider 68c, the slider in a given node display element may move in tandem with, or "shadow" a slider 55 in the scroll bar 54 of the associated browser window 50c. Manipulation of either slider 68c or 55 scrolls through the contents of document 52c, as well as moves the other slider accordingly. In addition, as disclosed in U.S. patent Ser. No. 08/820,798, filed on Mar. 19, 1997 by Cary L. Bates et al., a browser may include a secondary slider that provides finer granularity for scrolling within regions of a document. It may be desirable to further move a map display slider in tandem with such a secondary slider.

In addition, each slider may be dimensioned to reflect the relative region of the document that is currently displayed in the associated browser (e.g., for slider 68c, the relative size of the slider is set by the relative size of viewable region 53 of record 52c, within which is illustrated text 57, image 58, hypertext link 56a that corresponds to non-navigated link 66a, and link 56b that corresponds to non-navigated link 66b), or alternatively may be a fixed dimension element that is independent of the relative magnification of the browser. Each slider may be identical in appearance, or alternatively, sliders may be graphically associated with their respective browsers, e.g., through color or pattern coordination, or through an icon or alphanumeric indicator on the slider. For example, each browser 50a, 50b, 50c may have a different color header bar, with the colors used for the associated sliders 68a, 68b, 68c. Consequently, even when multiple sliders and browsers are used, the slider for a particular browser is easily distinguished. Also, a slider may be disposed within the boundaries of a node display element, or may be graphically linked thereto in other manners, e.g., extending along an outer edge thereof.

Map Display Data Structure

A representative map display object or data structure, also referred to herein as a map display, generally includes a map data structure with a plurality of node display element objects and link display element objects. For each node display element object, at least the following data may be included:

address or location of associated document
    size of associated document
    display characteristics, e.g., position, orientation, size, span, etc.
    status indication variables, e.g., selected, cached, matching, etc.
    data structure of links in associated document, with pointers to associated link display elements
    data structure of links pointing to associated document, with pointers to associated link display elements Similarly, for each link display element object, at least the following data may be included:

address or location of document referred to in associated link
    pointer to node display element within which associated link is located
    pointer to retrieve progress display element, or a percent complete variable Moreover, each slider may be represented as a scroll display element object, including at least the following data:

pointer to current node display element pointer to associated browser
relative location in document
relative size of slider
display information such as color or other coordination with browser Other data and/or objects may be associated with a given map display consistent with the invention. Moreover, it should be appreciated that the data and objects within a map display may be maintained in one or more of map manager 30, map registry 34, browser 36 and map display 60, with relevant information either distributed to the various modules that utilize such information, or with all modules maintaining duplicate information that is updated via events, whether separate or incorporated into the events described hereinafter for operating and maintaining a map display. Furthermore, it should be appreciated that a map display may be integrated with its associated map data structure such that display information such as current magnification, etc. is stored in the map data structure. In the alternative, a map data structure may be a separate structure that is accessed by one or more map display structures.

When used to represent HTML documents, node display element objects may be limited only to HTML-format documents, where any additional multimedia or executable objects, such as static and/or moving images, sounds, animations, Java applets, controls such as Java Beans and Active X controls, scripts such as Javascript scripts, etc., are considered to be contained within a common document, and thus not separately accessible. In the alternative, such multimedia and/or executable objects may themselves be represented by separate node display element objects and displayed as node display elements in a map display, whereby the objects are separately accessible. In such circumstances, it may be desirable to separately indicate the type of object through a visual, color, icon, or alphanumeric representation on the map display. It should be appreciated that the display of such objects may also be at the end user's option.

Map Display Operation & Utilization

The basic operation and utilization of a map display using the representative software environment of FIG. 4 is illustrated in FIGS. 5–8, which respectively illustrate the program flow during creation for a browser 36, map registry 34, map manager 30 and map display 60. As discussed above, the illustrated environment is an event-driven system, whereby each module generally performs selected operations in response to events received from other modules in the system, some of which being a result of user input. FIGS. 5–8 also illustrate several additional functions implemented by these modules that will be discussed later. It should be appreciated, however, that a significant number of additional functions are typically implemented in these components. Handling of these additional functions is illustrated, for example, at locks 128, 166, 232 and 276 in FIGS. 5, 6, 7 and 8, respectively.

For example, a browser is typically implemented in a window that typically receives events such as "minimize window", "maximize window", "resize window", "close window", and many others too numerous to mention. Other functions, such as routines to handle each menu choice, to select bookmarks, etc., are also typically present. These additional functions, however, are not relevant to a full understanding of the invention, and thus are not disclosed further herein.

Figure 6:
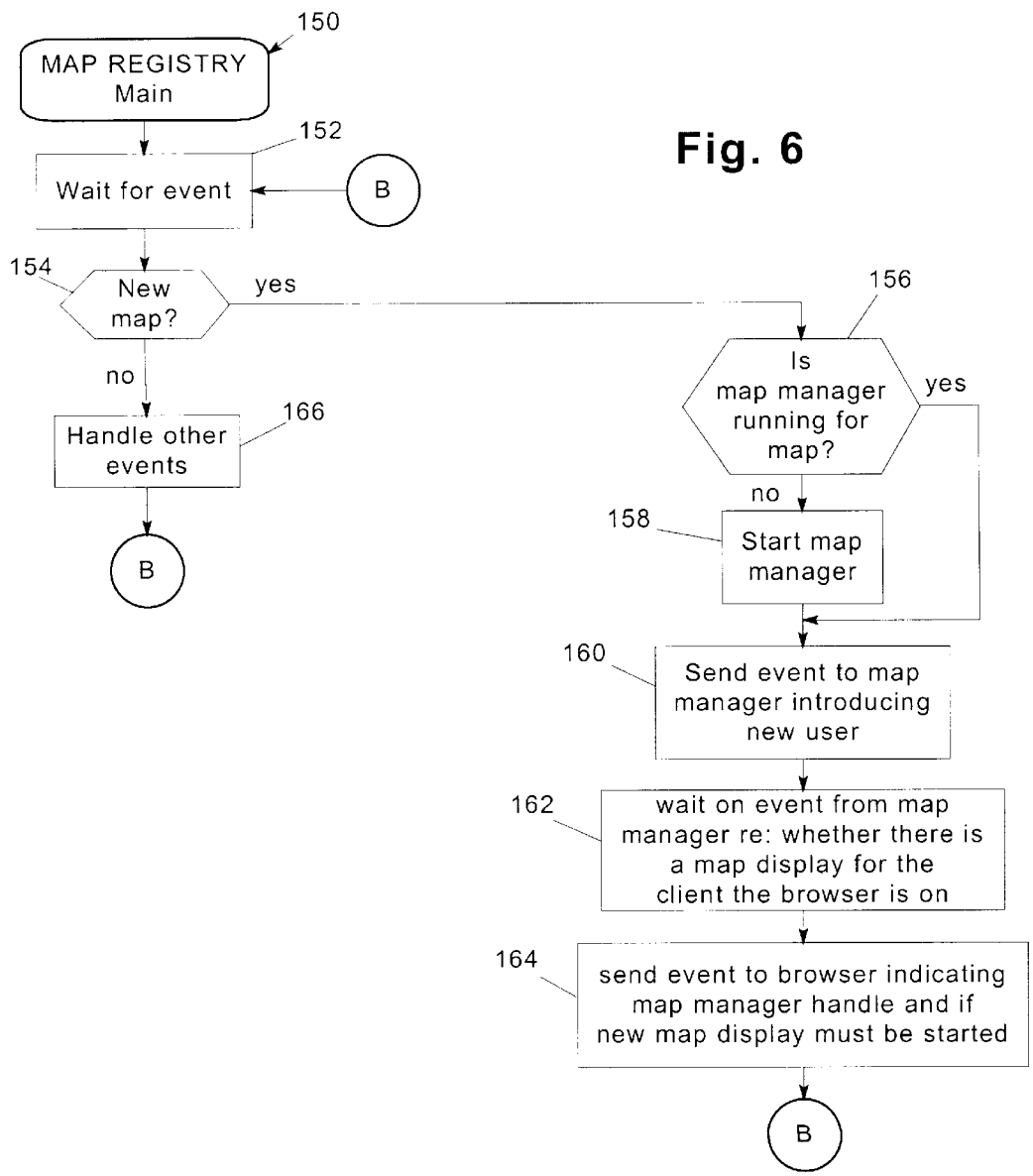
FIG. 6 is a flowchart illustrating the program flow of the map registry of FIG. 4.
Figure 7:
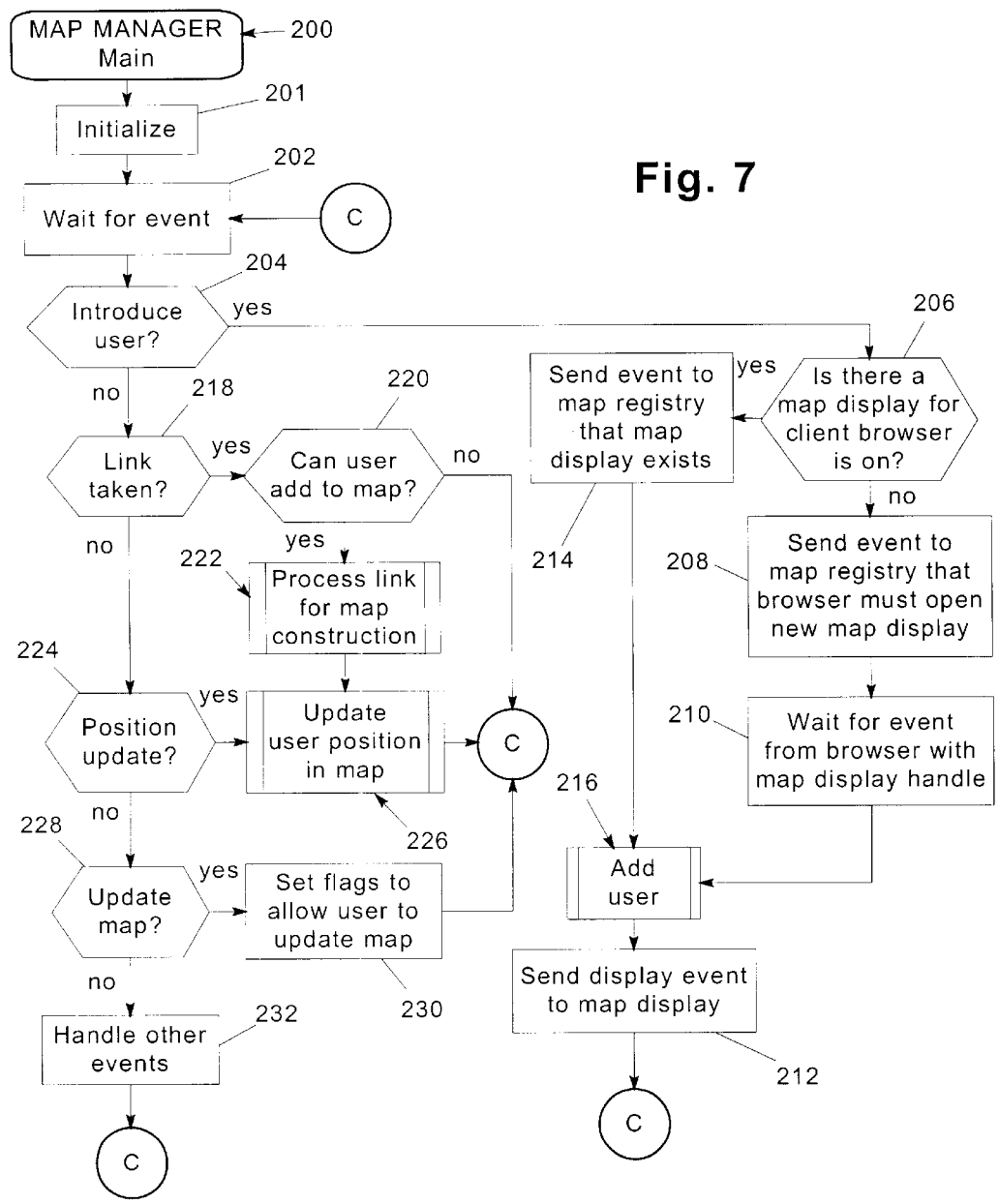
FIG. 7 is a flowchart illustrating the program flow of one of the map managers of FIG. 4.
Figure 8:
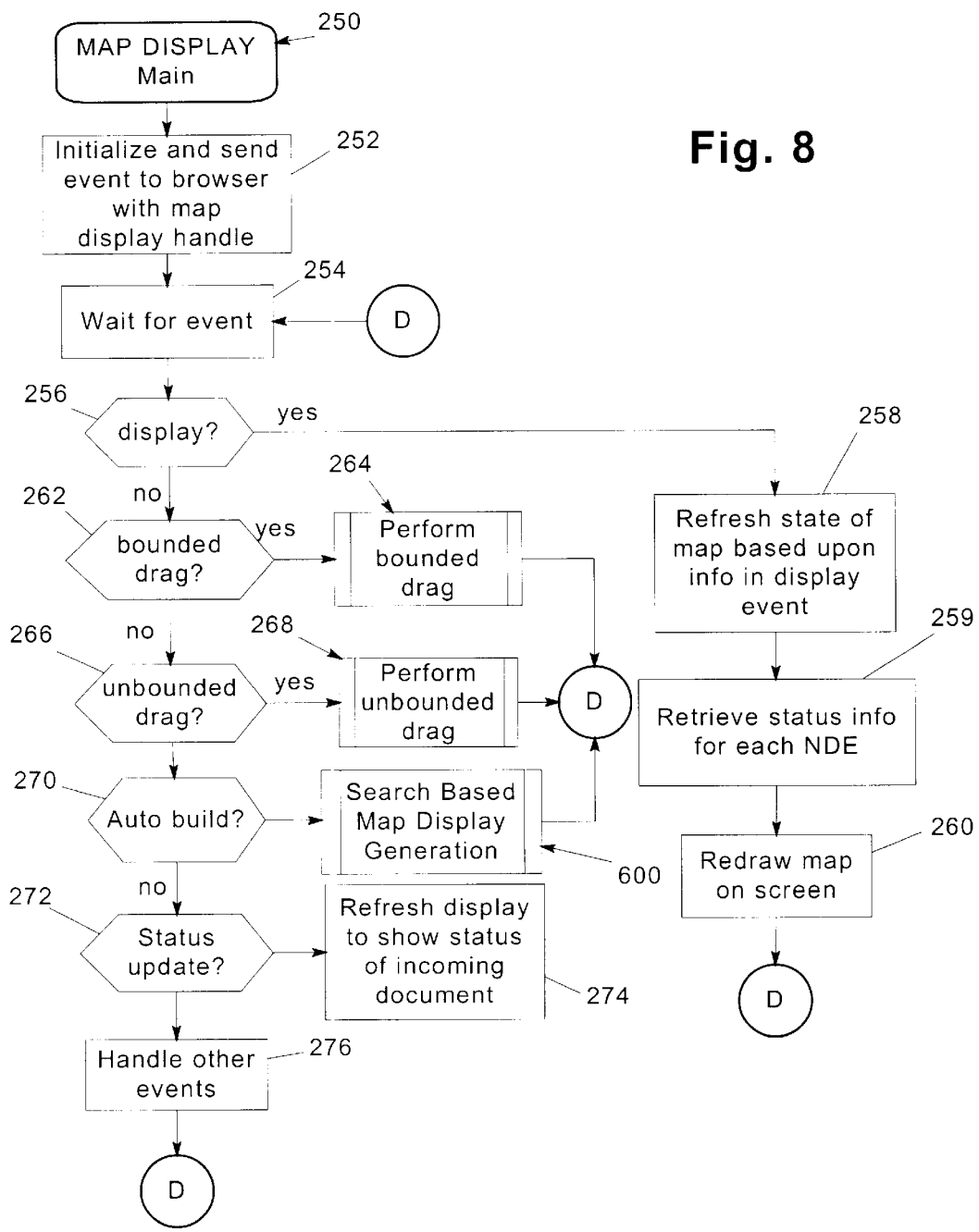
FIG. 8 is a flowchart illustrating the program flow of one of the map displays of FIG. 4.

As illustrated in FIGS. 5–8, browser 36 executes a main routine 100, map registry 34 executes a main routine 150, map manager 30 executes a main routine 200 and map display 60 executes a main routine 250. Each of these routines waits for and receives various events (or messages) and passes control to appropriate subroutines to handle the events, e.g., at block 101 (FIG. 5), block 152 (FIG. 6), block 202 (FIG. 7) and block 252 (FIG. 8). It should be appreciated that event checking and handling functions may be delegated to separate threads, or that specific events may be directed to particular handling routines, rather than the main routines or event checking routines of each module. In general, any event-driven, procedural, or other manner of initiating execution of specific program code to handle certain requests by an end user may be used consistent with the invention.

Map Display Initialization

Figure 5:
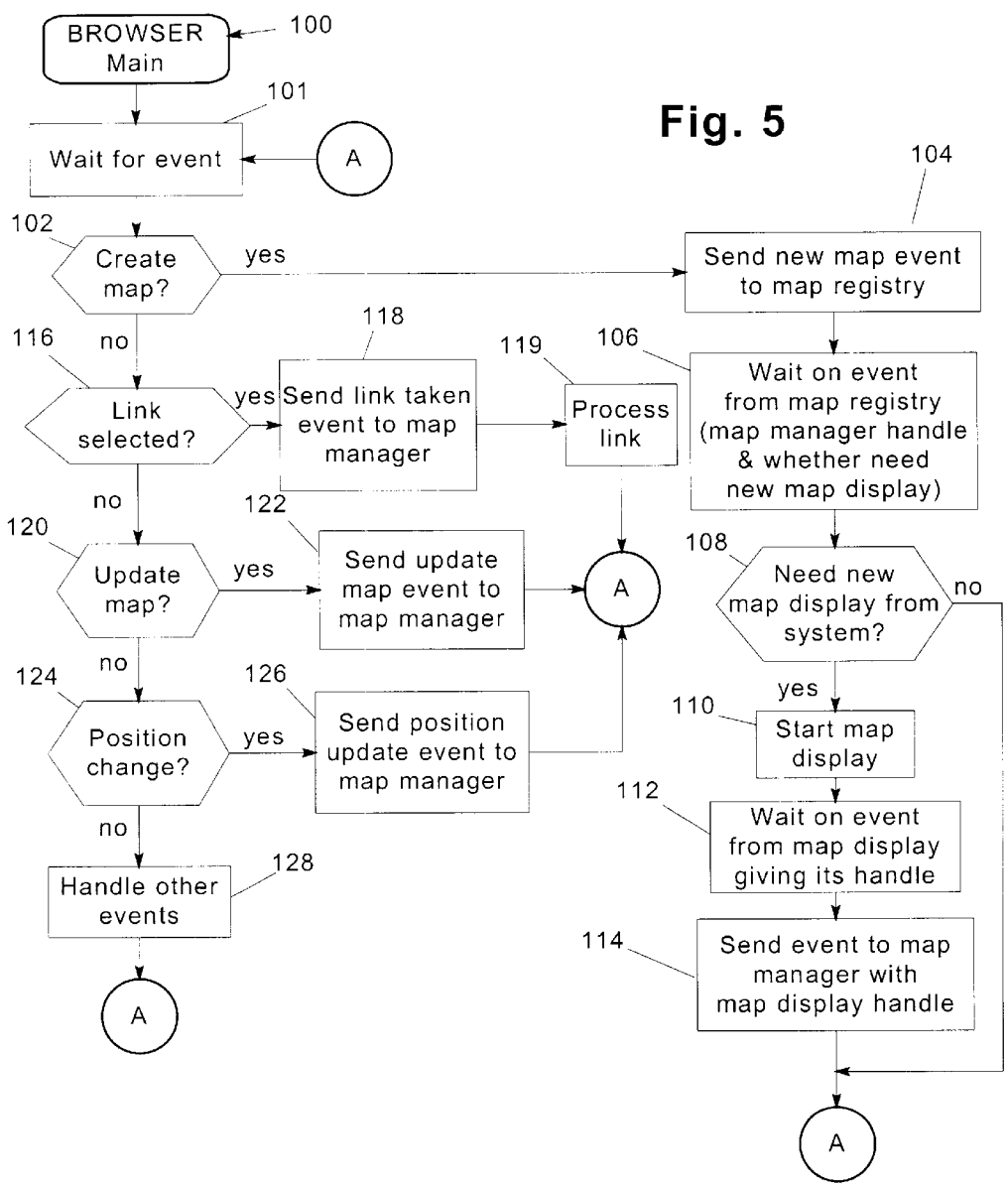
FIG. 5 is a flowchart illustrating the program flow of one of the browsers of FIG. 4.

A new map display is initialized typically in response to a user request to create a new map display, which may be initiated, for example, by any number of user interface components (e.g., a toolbar button, a menu bar selection, a pop-up menu selection, a keystroke, or an icon, among others). Referring first to FIG. 5, a request to create a new map display generates a create map event, which is received by browser 36 (e.g., represented by block 102), and thereby initially handled by a handling routine starting at block 104.

In block 104, a new map event is sent to the map registry 34 to determine whether a new map display is needed. The event typically includes information regarding the name of the map to be displayed. A new map display is needed when no other browser on the client is using the map, but is not needed when a map display is already opened on the client for this map.

Turning to FIG. 6, map registry 34 receives the new map event at block 154 and processes the event starting at block 156, where it is determined whether a map manager is currently running for the map requested. If a map manager is not currently running, control passes to block 158 to start the appropriate map manager 30. Starting of the map manager is illustrated by initialize block 201 (FIG. 7), where any necessary initialization and housecleaning functions are performed. Again referring to FIG. 6, once the map manager is running, control passes to block 160 to send an introduce user event to introduce a new user, that is, a new browser window, to the map manager.

Referring to FIG. 7, map manager 30 detects the introduce user event at block 204 and passes control to a handling routine starting at block 206, where the map manager determines whether a map display currently exists for the client upon which the browser is executing. If not, control passes to block 208 to send an event to the map registry indicating that the browser must open a new map display.

Referring again to FIG. 6, block 162 waits for receipt of such an event, and then passes control to block 164 to send an event to the browser providing the browser with the handle to the appropriate map manager and indicating that the browser must open a new map display, whereby the map registry's operation in creating a new map is complete.

Referring back to FIG. 5, browser 36 waits for the event from the map registry at block 106 and, if block 108 determines that the event indicates that a new map display is required, a new map display is started at block 110. Otherwise, block 108 terminates execution of the browser handling routine, returning control to block 101.

Referring now to FIG. 8, when a new map display is started, an initialization block at 252 performs basic initialization functions and returns an event to the browser providing the browser with a handle for the map display. Receipt of this handle by the browser is illustrated at block 112 of FIG. 5. After receipt of the handle, the handle is supplied via an event to the map manager in block 114, prior to completion of the browser handling routine and return of control to block 101.

Returning to FIG. 7, the map manager receives the event with the map display handle from the browser at block 210, and then the map manager adds the user in block 216 (discussed below). Next, the map manager sends a display event to the new map display in block 212.

As shown in FIG. 8, this event is received at block 256, whereby a display handling routine is executed starting at block 258 to refresh the state of the map display based upon the information provided in the display event. The display handling routine is a general routine utilized to update the data stored for a map display element object during both initial display and subsequent modifications to the display. Next, an status information, e.g., cache status, matching status, selected status, etc. (discussed below), is retrieved for each node display element so that, in block 260, the map display is redrawn, along with appropriate status indicators for each node display element. Control then returns to block 254.

Returning to FIG. 7, after the display event is sent to the map display in block 212, control returns to block 202. In addition, referring back to block 206, if a map display currently exists on the client for the map in question, an event is sent to the map registry indicating the same at block 214, whereby thereafter the user is added in block 216. Should a map display currently exist for the client, processing by the map registry proceeds in the same manner as if a new map display must be started, except that block 164 (FIG. 6) indicates in an event to the browser that no new map display must be started. After the routine in block 216 returns, a display event is sent to the map display in block 212, as described above, to refresh the map display.

Add user block 216 is illustrated in greater detail in FIG. 9. In this routine, a block 280 is executed to determine whether the map is empty—that is, whether any node display elements exist in the map data structure. If so, control passes to block 282 to add a root node display element for the map data structure that is associated with the document the browser is on. If not, the addition of a root node display element in block 282 is bypassed by block 280.

Next, a block 284 is executed to add a scroll display element for the user. The new scroll display element is initialized to point to the node display element associated with the document currently displayed in the browser. In addition, information related to the position, and optionally, the size, of the displayed contents in the browser relative to the overall document are also stored in the scroll display element, such that the element is displayed in the node display element tracks the browser.

Returning to FIG. 7, after the user is added by block 216 and the map display is refreshed by block 212, handling of the introduce user event is completed by the map manager, and control returns to block 204. Creation of a new map display is then complete.

FIG. 10 illustrates an exemplary map display 90 after creation, having only a single node display element 92 that functions as the root of the map display. Moreover, at least one browser window (not shown in FIG. 10) is opened to display the contents of the document associated with root node display element 92, and a slider 96, corresponding to the region of the document currently displayed in node display element 92, is displayed therein. In addition, if it is desired to illustrate non-navigated links in the document associated with element 92 (e.g., if such an option is enabled by an end user), link display elements (e.g., link display element 94) may also be displayed at the same relative location on node display element 92. It may further be desirable to visually distinguish navigated and non-navigated links, e.g., using different colors, icons, patterns, line styles, etc. Map display 90 as illustrated in FIG. 10 is an adjoining-type map display; however, it should be appreciated that a non-adjoining-type map display has a similar appearance upon creation.

Dynamic Node Addition

As discussed above, a map display is typically constructed dynamically based upon user navigation through linked records or documents. One suitable program flow for implementing this feature is initiated in browser 36 by an end user selecting a link to a target document in the currently-displayed document, or current document, for the browser. The user selection of a link is detected by browser 36 at block 116 of FIG. 5, where, in response to the user selection, a link taken event is sent to map manager 30 in block 118, and the link is then processed (i.e., the document referenced thereby is loaded from a network or a local cached copy if present) in a conventional manner in block 119.

As illustrated in FIG. 7, the link taken event generated by browser 36 is detected in block 218 to pass control to block 220 to determine whether the user is permitted to add to the map display. In a groupware environment, for example, network security features may be utilized to limit the access of certain users to read only, or browse only, status. Also, in other embodiments an end user may be able to select whether or not he or she wants to be able to add to the map display or not. Consequently, if an end user is not authorized to make modifications to a map display, the map display may not be updated with any additional node display elements.

In addition, in some circumstances certain users may not be permitted to browse documents other than provided on a given map display, which may be useful in some intranet or extranet applications where users may be locked out of certain sensitive data. It should also be appreciated that different users may be granted different access capabilities for given map displays. In the alternative, for applications such as stand-alone environments where users are not sharing map displays, block 220 may be omitted.

As one example, a user may be required to first request permission through a suitable user interface in the browser to modify a given map display, e.g., as illustrated by block 120 in FIG. 5. In response to such a request, the browser may forward an authorize update event to the map manager in block 122, which is detected by the map manager at block 228 of FIG. 7. If a user is allowed to modify a map, one or more flags are set to authorize such activity, as represented in block 230.

Returning to block 220 of FIG. 7, if a user has been granted authorization to add node display elements to a map display, control is passed to block 222 to process the link for map construction. Block 222 is illustrated in greater detail in FIG. 11, beginning with determining whether a link display element currently exists in the map display between the document associated with the current node element and another node display element associated with the target document. If so, control passes to block 301 to set the current document to the target document, i.e., the link to the target document is taken and reflected in the map display. If not, control passes to block 302 to determine whether a node display element in the map display is associated with the target document.

First in the situation in which the target document is not associated with an existing node display element, control passes to block 316 to determine the relative size of the new target node display element based upon the relative size of its associated document to other documents represented in the map display. This determination may require that the other node display elements be resized, e.g., if the target node display element would be outside of a predetermined range fixed for the node display elements. In the alternative, if the node display elements are not dimensioned in accordance with the relative sizes of their associated documents, this block may be eliminated.

Figure 12:
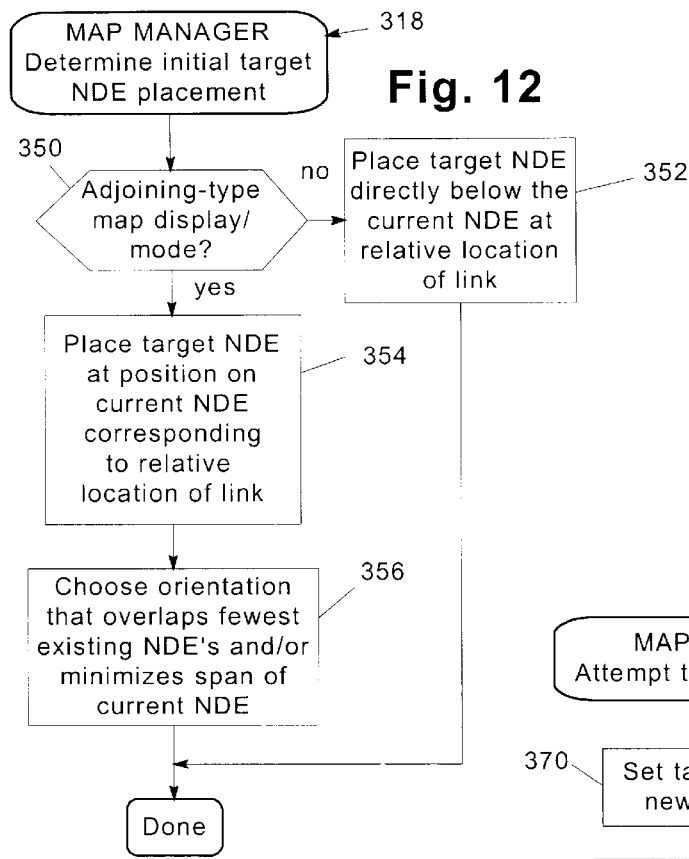
FIG. 12 is a flowchart illustrating the program flow of the determine initial placement routine of FIG. 11.

Next, in block 318, an initial placement for the target node display element is made. This block is illustrated in greater detail in FIG. 12. Depending upon whether the map display is an adjoining-type or non-adjoining-type map display, or, if selectable by an end user, the map display is in an adjoining-type or non-adjoining-type mode, control is passed from block 350 to either of blocks 352 or 354. In the case of a non-adjoining-type map display (or selected mode), block 352 merely places the target node display element for the target document directly below the current node display element, with a horizontal position set by the relative location of the link in the current document. The vertical position is typically a fixed distance from the current node display element such that all sibling node display elements are spaced along a horizontal axis.

In the case of an adjoining-type map display (or selected mode), block 354 fixes the starting end of the target node display element at the position of the current node display element corresponding to the relative location of the link in the current document. Next, in block 356, different permissible orientations of the target node display element (typically where the target node display element extends at one of a plurality of angles from its intersection point with the current node display element—and often constrained to a few angles, e.g., every 45 or 90 degrees) are tested. Among the various possible orientations, it is desirable to select that which either overlaps the fewest existing node display elements, and/or that which minimizes the span of the current node display element (discussed below). For example, priority may be given to orientations that minimize the number of overlaps, with the span information used to select between orientations with equal numbers of overlaps. Other selection criteria may be used in the alternative. After the target node display element is placed, routine 318 terminates.

Returning to FIG. 11, after the target node display element is initially placed, block 320 determines whether the target node display element (in the case of a non-adjoining-type map display), or a line between the current and target node display elements (in the case of an adjoining-type map display), overlaps another display element. If not, control passes to block 324 to accept the initial placement of the target node display element in the map display and insert a suitable link display element into the map display connecting the target and current node display elements.

If another display element is overlapped, however, block 320 passes control to block 322 to attempt to rearrange the map display and fit the target node display element within the map display.

Figure 13:
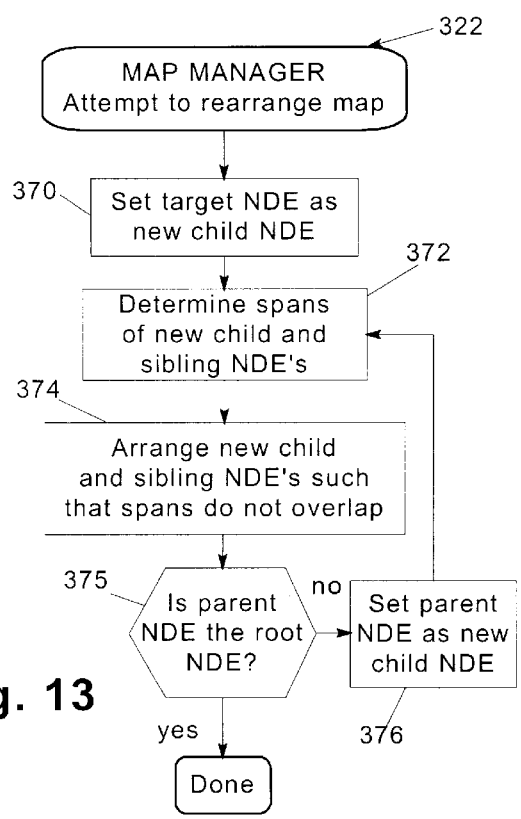
FIG. 13 is a flowchart illustrating the program flow of the attempt to rearrange map display routine of FIG. 11.

FIG. 13 illustrates in greater detail one suitable program flow for attempting to rearrange the map display in block 322. This manner of rearranging the map display relies on the "span" of node display elements when rearranging a map display. The "span" of a given node display element represents the maximum dimension of the node display element and all of its "descendant" node display elements (i.e., all "child" node display elements associated with documents having links in the record associated with the given node display element, the children of those child node display elements, and so on), in a predetermined direction. Typically, the predetermined direction is along the longitudinal axis of the parent to the given node display element, which often is the direction along which a slider moves in the parent node display element. However, it should be appreciated that some embodiments may not utilize integrated sliders or elongated node display elements, and therefore, another dimension may be utilized to determine the span of such elements.

Figure 14A:
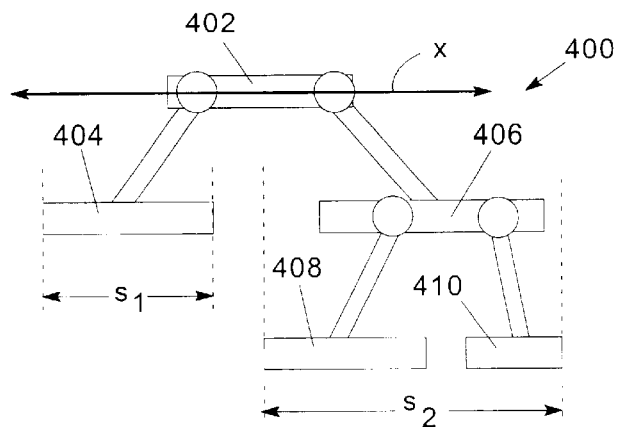
FIGS. 14A, 14B and 14C are block diagrams of an exemplary non-adjoining-type map displays illustrating the placement of a target node display element and the subsequent rearrangement of the map display accordingly.
Figure 14B:
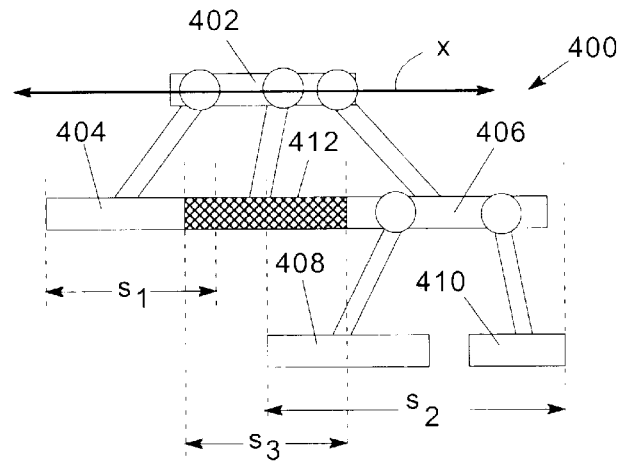

For example, FIG. 14A shows that the span of two node display elements 404 and 406 in a non-adjoining-type map display 400 are respectively indicated by $s_1$ and $s_2$, with the span of node display element 406 being also dependent upon that of its child node display elements 408 and 410. The direction in which the span dimension is taken is along the direction represented by axis x, the longitudinal dimension of the common parent node display element 402. Now referring to FIG. 14B, assuming a target node display element 412 is initially placed at the illustrated position in map display 400 by block 318 in the manner described above, it can be appreciated that the span $s_3$ of the target node display element 412 overlaps that of both of the sibling node display elements 404 and 406.

Figure 15A:
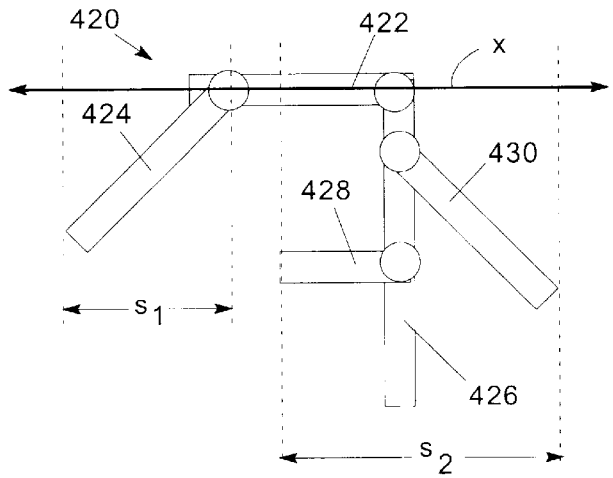
FIGS. 15A, 15B and 15C are block diagrams of an exemplary adjoining-type map displays illustrating the placement of a target node display element and the subsequent rearrangement of the map display accordingly.
Figure 15B:
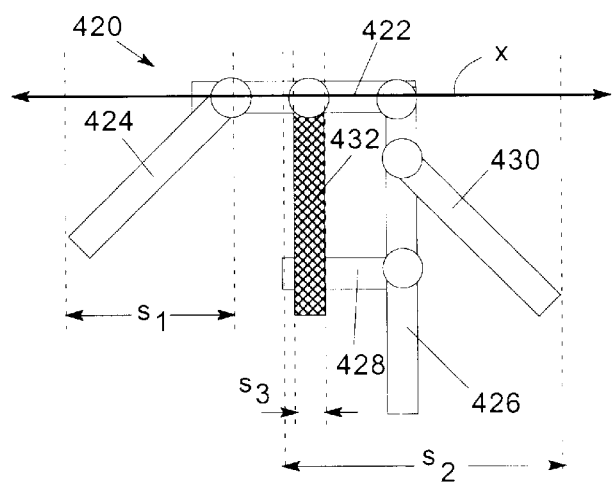

Similarly, FIG. 15A shows the span of two node display elements 424 and 426 in an adjoining-type map display 420 are respectively indicated by $s_1$ and $S_2$, with the span of node display element 426 being also dependent upon that of its child node display elements 428 and 430. The direction in which the span dimension is taken is along the direction represented by axis x, the longitudinal dimension of the common parent node display element 422. Now referring to FIG. 15B, assuming a target node display element 432 is initially placed at the illustrated position in map display 420 by block 318 in the manner described above, it can be appreciated that the span $s_3$ of the target node display element 432 overlaps that of the sibling node display element 426.

Figure 15C:
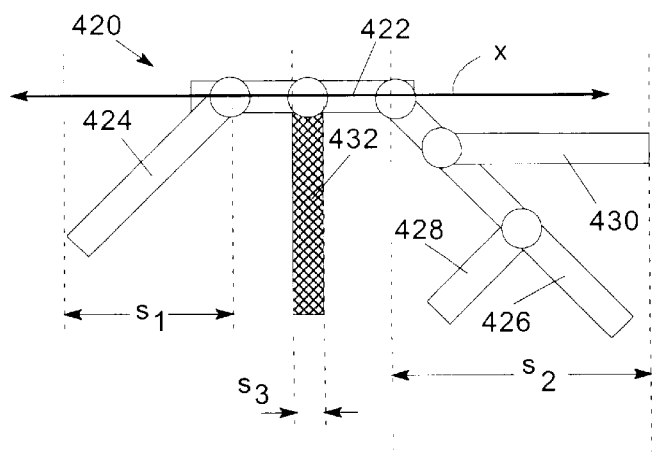
Figures 16, 17:
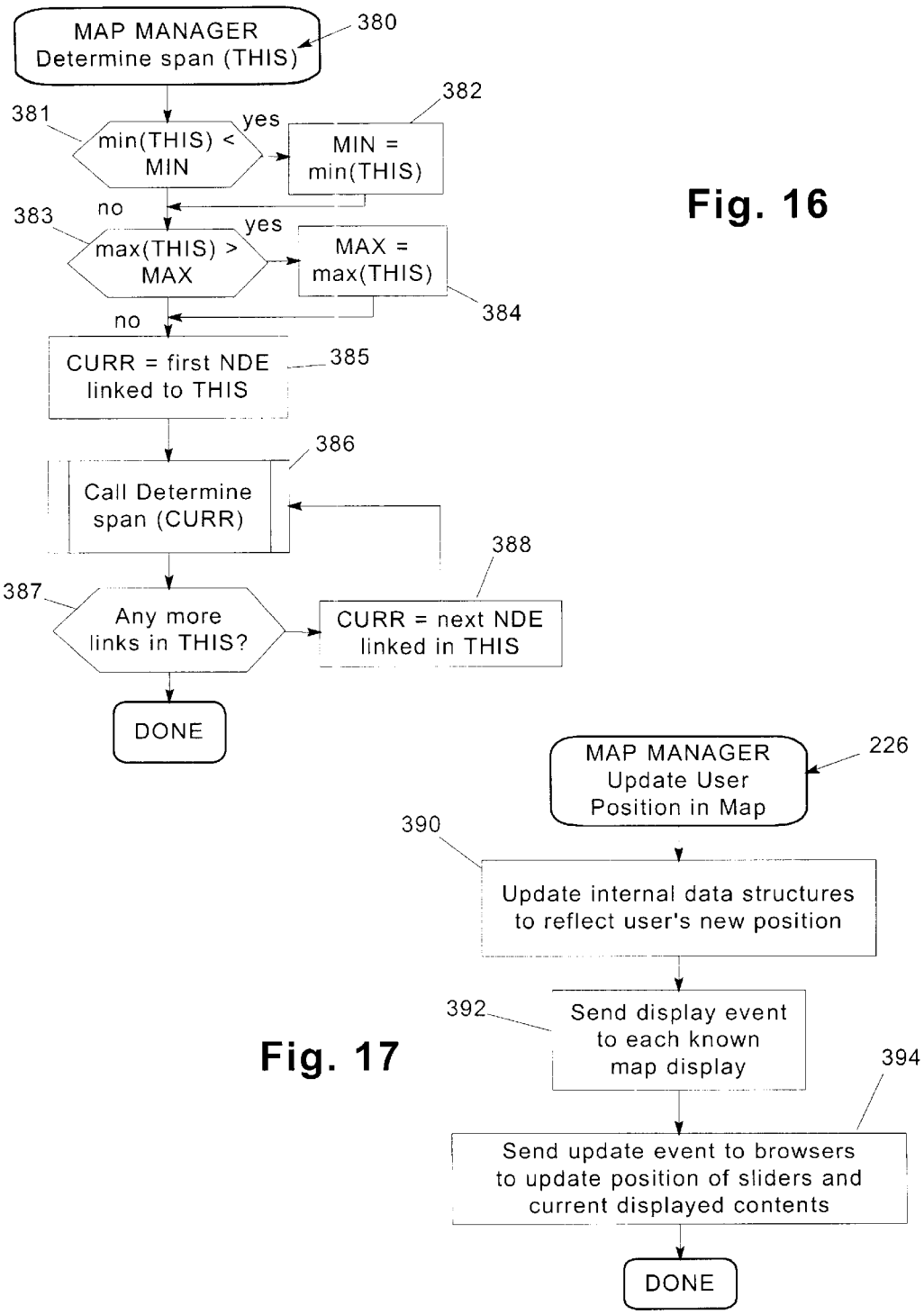
FIG. 16 is a flowchart illustrating the program flow of the span determining routine of FIG. 13.
FIG. 17 is a flowchart illustrating the program flow of the update user position in map routine of FIG. 7.

The span of a node display element may be calculated, for example, using a recursive routine such as determine span (THIS) routine 380 of FIG. 16. In this routine, a pair of global variables, MIN and MAX, are maintained to determine the overall minimum and maximum extents of the node display element and its descendants. When the span is taken along a horizontal axis (as shown in FIGS. 14A–14C and 15A–15C), MIN and MAX respectively correspond to the leftmost and rightmost points of a node display element and its descendants. However, it should be appreciated that for some node display elements in an adjoining-type map display, MIN and MAX are not taken along a horizontal axis since the longitudinal axis of the parent to such node display elements is not horizontal. As an example, when rearranging node display elements 428 and 430 shown in FIG. 15B, the longitudinal axis of the parent node display element 426, and thus the predetermined direction, is vertical. Consequently, MIN and MAX instead represent top and bottom extents of each node display element.

Routine 380 is initially called for the node display element to be analyzed (i.e., THIS=the node display element to be analyzed), where block 381 determines whether the minimum extent of the node display element in the predetermined direction (designated by the function min(THIS)) is less than (beyond) that set in MIN (which initially may be set to very large number so the minimum extent of the node display element to be analyzed is used). If so, block 382 is executed to set MIN to this value. Similarly, block 383 determines whether the maximum extent of the node display element in the predetermined direction (designated by the function max(THIS)) is beyond that set in MAX(which initially may be set to zero or a negative number so the maximum extent of the node display element to be analyzed is used). If so, block 384 is executed to set MAX to this value.

Next, in block 385, a CURR variable is set to the first node display element linked to THIS, and the determine span routine is recursively called for CURR, represented at block 386. Next, block 387 determines if there are any more links in THIS, and if so, CURR is set to the next NDE linked in THIS in block 388 and control is passed to block 386 to call the determine span routine for the next link. Once all links have been traversed, MIN and MAX will contain the minimum and maximum extents, or the span, of the node display element analyzed. Other routines may be used in the alternative.

Returning to FIG. 13, the program flow begins in block 370 by setting the target node display element as a "new child" node display element. Next, in block 372, the spans of the new child node display element and its sibling node display elements are obtained by calling the determine span routine of FIG. 16 for each (e.g., dimensions $s_1$, $s_2$ and $s_3$ in FIGS. 14B and 15B). It should be appreciated that the target node display element would not initially have any descendants, so in certain embodiments its span may merely be set based upon its minimum and maximum extents in the predetermined direction, rather than calling the determine span routine of FIG. 16.

Next, in block 374, the child and sibling node display elements are arranged such that their spans do not overlap. This may be performed in any number of manners, typically by modifying the location, orientation, size and/or shape of the child and sibling node display elements such that their minimum and maximum extents do not overlap.

Figure 14C:
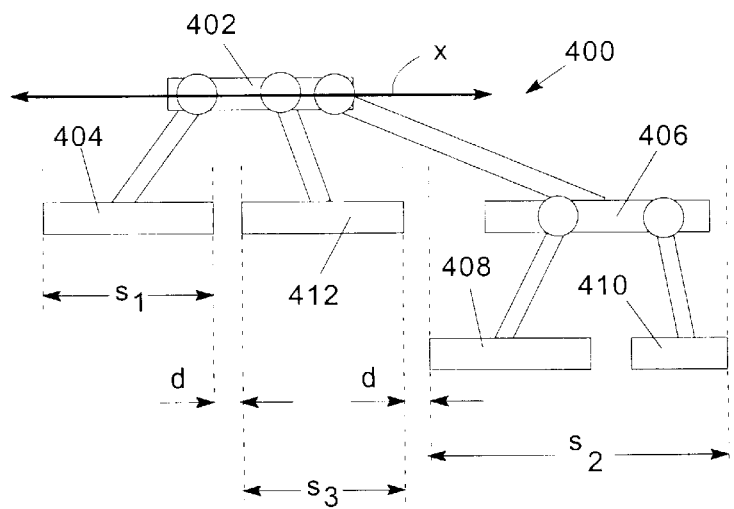

For example, as shown in FIG. 14C, for non-adjoining-type map display 400, node display elements 404, 406 and 412 may be arranged simply by translating either of node display elements 404 or 412, along with their descendant node display elements, along the general direction of the common parent node display element (represented by axis x). The spans may abut one another, or may be separated by a fixed distance, e.g., distance d shown in FIG. 14C. For an adjoining-type map display such as map display 420, a translation of node display elements may also be utilized; however, it may also be useful to alter the orientation of node display elements, as shown in FIG. 15C. To prevent overlap of the spans of node display elements 424, 426 and 432, node display element 426, as well as its descendant node display elements 428 and 430, have been rotated 45 degrees counter-clockwise.

Other arrangement techniques may also be used. For example, it may not be possible in a given circumstance to utilize translation or rotation of node display elements. Instead, the relative size of the target node display element, its siblings, or more typically, their parent, may be adjusted to provide the requisite separation. In such circumstances, it may not be possible to retain a correspondence between the size of the node display elements and their associated documents. Furthermore, as exhibited by node display elements 428 and 430, descendant node display elements need not extend from the same side of a given parent node display element. In such instances, the spans thereof may overlap without adverse effects, and block 320 of FIG. 11 may determine that rearrangement thereof may not be required such that routine 322 is not executed.

It may also be possible to adjust the size of node display elements only along longitudinal portions thereof between link display elements. In such instances, movement of a slider may be non-linear across a given node display element, with movement in a stretched portion between two link display elements scrolling the associated document at a different rate than when in other portions of the node display element.

Furthermore, a recursive technique may be utilized to attempt to rearrange descendant node display elements and thereby adjust the span of sibling node display elements. With this technique, therefore, the spans of sub-maps are minimized from the bottom up, resulting in smaller overall arrangements. This technique may be utilized in conjunction with, or in lieu of, selecting orientations of node display elements during initial placement to minimize spans within a map display.

Returning to FIG. 13, after the new child and sibling node display elements are rearranged, control passes to block 375 to determine if the parent to the new child node display element is the root node display element for the map display. If not, rearrangement of the map display occurs at the previous hierarchical level of the map display by setting the parent node display element as the new child node display element, and passing control back to block 372. Once the parent to the new child node display element is determined to be the root node display element, however, rearrangement of the map display is complete.

Now returning to FIG. 11, after the map display is rearranged, control passes to block 324 (discussed above) to insert a link display element, whereby the link processing routine is completed.

Figure 11:
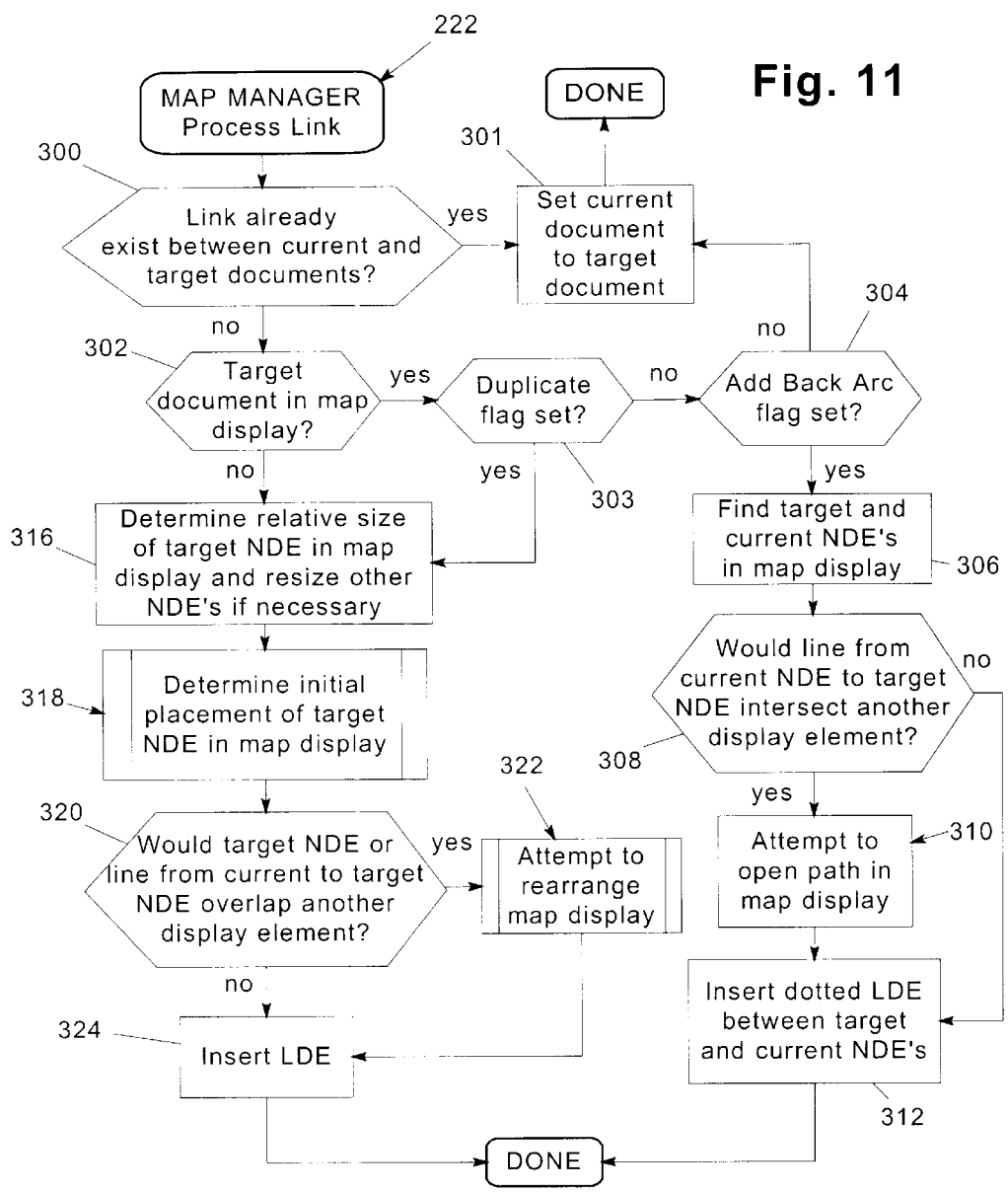
FIG. 11 is a flowchart illustrating the program flow of the process link routine of FIG. 7.

Now referring again to block 302, several optional functions may be implemented when a node display element associated with a target document is in the map display, but no link currently exists between the current and target documents. Each function may be implemented as the only manner of handling such situations, or alternatively, the handling of such situations may be controlled at an end user's option, e.g., using duplicate and back arc flags as illustrated in FIG. 11.

For example, it may be desirable to build duplicate node display elements for a given document, as represented by checking a duplicate flag in block 303 and passing control to block 316 for further processing when a set flag is encountered. Whenever a link to a document that is already represented elsewhere is taken, a new node display element is created without any reference to the other node display elements for the document. Duplicate node display elements may be distinguished via colors, icons, alphanumerics or other indications, e.g., to facilitate maintenance and "pruning" of a map display that later grows too unwieldy, and to alert an end user that he or she has previously visited this location.

As a further example, it may be desirable to jump back to an earlier node display element for the target document whenever the link between the current and target documents is selected. This is represented by finding neither a duplicate flag or a back arc flag set by an end user, whereby blocks 303 and 304 ultimately pass control to block 301 to set the current document to be the target document.

As another example, it may be desirable to build separate links between the node display elements for the current and target documents, as represented by detecting an add back arc flag in block 304. A back arc is an alternate graphic representation of a link, e.g., dashed line 65 illustrated in FIG. 1, and may include simply a curved or straight line extending between the current and target node display elements and overlaying other display elements. In the alternative, a back arc may be generated by routing a line between existing display elements, e.g., using a line routing algorithm known in the art. As another alternative, as illustrated by blocks 306–312, a map display may be rearranged to facilitate routing a back arc between display elements. In this latter routine (which would likely generate a back arc similar to line 65 of FIG. 1), blocks 306 and 308 determine, based upon the node display elements for the target and current documents, whether a line or arc extending therebetween intersects other display elements. If so, the map manager attempts to open a path in the map display in block 310, which occurs in a similar manner to rearrangement of the map display discussed above with reference to block 322 and illustrated in FIG. 13. Next, the map manager routes a back arc (e.g., a dashed or dotted arc) between the target and current node display elements in block 312. Otherwise, if the line or arc does not intersect other display elements, control may be diverted directly to block 312 to insert the back arc, prior to exiting the routine.

Returning now to FIG. 7, after a navigated link is processed in block 222, control passes to block 226 to update the user position in the map display. Block 226 is illustrated in greater detail in FIG. 17. The program flow of block 226 begins at block 390, where the internal data structures representative of the elements in the map display are updated to reflect a user's new position (if any). Next, in block 392, a display event is generated for each known map display (which is handled in blocks 256–260 as discussed above). Next, in block 394, an update event is sent to each browser to update the position of its slider and its current displayed contents.

As a result, each map display and browser is then updated to reflect that the link to the target document was taken. Continuing with the exemplary map display 90 shown in FIG. 10, FIG. 18A illustrates the resulting adjoining-type map display 90, wherein a second node display element 98 has been added adjoining to and extending from root node display element 92. A link display element 94 is displayed at the intersection of elements 92 to represent the link between the associated documents. Moreover, node display element 98 has been set as the current node display element, whereby slider 96 has been moved from element 92 to element 98 and its associated browser (not shown in FIG. 178) displays the contents of the document associated with element 98.

Similarly, FIG. 18B illustrates a non-adjoining-type map display 90', wherein a second node display element 98' has been added parallel to and visually separated from a root node display element 92'. A link display element 94' is also displayed, including a link marker 94a' illustrating the relative location of the link in the document associated with element 92', and a connector 94b' extending between the link marker and element 98'. Moreover, node display element 98' has been set as the current node display element, whereby a slider 96' has been moved from element 92' to element 98' and its associated browser (not shown in FIG. 18B) displays the contents of the document associated with element 98'.

Map Navigation

Once a map display is constructed in the manner discussed above, an end user is able to utilize the map display in revisiting documents as he or she desires. Moreover, it may be desirable to maintain a list of favorite web sites in a map display so that some or all of the sites may be visited on a daily basis. Also, it may be desirable to maintain subject-specific or reference map displays that an end user constructs relating to a given subject (e.g., separate map displays might be constructed related to gardening, new music, object-oriented programming languages, etc.). The map displays illustrated herein have countless usages in browsing not only Internet documents, but internal corporate documents on an intranet, or other forms of linked records.

A number of navigational tools and features may be utilized for navigating through map displays consistent with the invention. For example, a "bounded drag" feature may be provided whereby an end user is able to drag a slider through one or more node display elements such that the browser associated with the slider is updated in real time to display the contents of the document associated with the current node display element, including the relative position thereof represented at the current position of the slider. In this manner, browsing between documents, and browsing within documents, is integrated into the same user input operation.

In an adjoining-type map display such as illustrated in FIG. 1, movement of a slider from one node display element to another linked thereto causes the new node display element to become the current node display element, with its associated document displayed in the browser associated with the slider. For a non-adjoining-type map display such as illustrate in FIG. 2, a drag operation from one node display element to the next may require an end user to drag the slider along the length of the connecting link display element before the link is actually taken. Alternatively, the slider may automatically be moved to the next node display element after the slider is drug onto the link display element (e.g., either an instantaneous or animated movement).

As illustrated in FIG. 8, a bounded drag routine 264 is executed in response to receipt of a bounded drag event by the map display at block 262. Such an event may be initiated, for example, by clicking on a slider and moving the pointer while holding the mouse button down, whereby an end drag event is signaled by releasing the button. In the alternative, an end user may be able to simply click on a slider and move the pointer without holding the button down, whereby an end drag event may be signaled by clicking on the button again.

Figure 19:
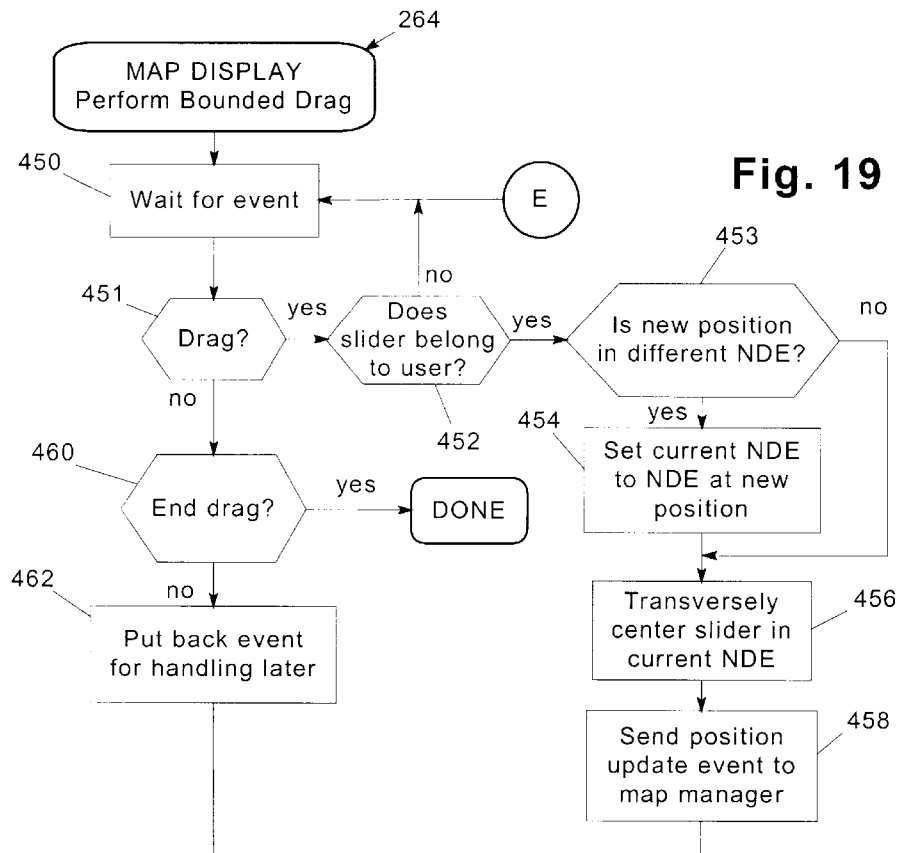
FIG. 19 is a flowchart illustrating the program flow of the perform bounded drag routine of FIG. 8.

One suitable program flow for routine 264 is illustrated in FIG. 19. First, the map display waits for an event at block 450 (this block may also be bypassed in the first pass through the routine). Next, if the event received is a drag event, block 451 passes control to block 452 to handle the event. Typically, multiple drag events will be passed to the map display as the end user continues to move the pointer with the mouse button held down.

Assuming that a slider is initially disposed in a current node display element, upon receipt of a drag event, block 452 determines first whether the slider currently pointed to belongs to the user. If it does not, e.g., when a slider displays the position of another user accessing the map, the event is discarded and control is returned to block 450.

If the slider does belong to the user, control is passed to block 453 to determine whether the new position of the pointer is a different node display element than the current. If not, control is diverted to block 456. If it is, the node display element at the new position of the pointer is set as the current node display element in block 454 prior to passing control to block 456. Moreover, as will be discussed below with reference to FIG. 36, an elastic boundary between node display elements may also be implemented in a bounded drag routine to minimize an end user from inadvertently switching to a new node display element due to imprecision in mouse movement.

At block 456, the slider is transversely centered in the current node display element. For an elongated node display element in which a slider generally moves along a longitudinal axis, transversely centering the slider involves maintaining the slider within the boundaries of the node display element along a direction perpendicular to the longitudinal axis thereof, whereby the movement of the slider is "bounded" within the current node display element. This has the effect of filtering out the transverse component of any user movement of the mouse.

Next, in block 458, a position update event is sent to the map manager, which as discussed above in relation to dynamic node addition, may be handled by routine 226 of FIG. 17. The position update routine in effect coordinates the changes to the map display with the browsers and any other modules that rely on such information. Control then passes back to block 450 to wait for the next event.

If the event received in block 450 is an end drag event (e.g., as the result of the end user releasing the mouse button), routine 264 is terminated, and control returns to routine 250 of FIG. 8. If the event received in block 450 is neither a drag event or end drag event, the event is temporarily stored in block 462 prior to passing control back to block 450 to process the next event.

It should be appreciated that routine 264 operates to assume control of the map display so long as a drag event is in progress. In the alternative, the receipt of an event other than a drag event or end drag event may prematurely terminate the routine so that the event may be handled immediately.

Another useful navigational tool is an "unbounded" drag operation where an end user is able to drag a slider directly to a node display element of interest without traversing through each intervening node display element in the map display. Such an operation may be initiated using a similar mouse input to the bounded drag operation, e.g., if a specific unbounded mode is selected through a toolbar button, keyboard shortcut, pop-up menu or the like. An unbounded drag operation may also be initiated, for example, if an end user moves the mouse pointer beyond a predetermined distance from the boundaries of the current node display element.

Figure 20:
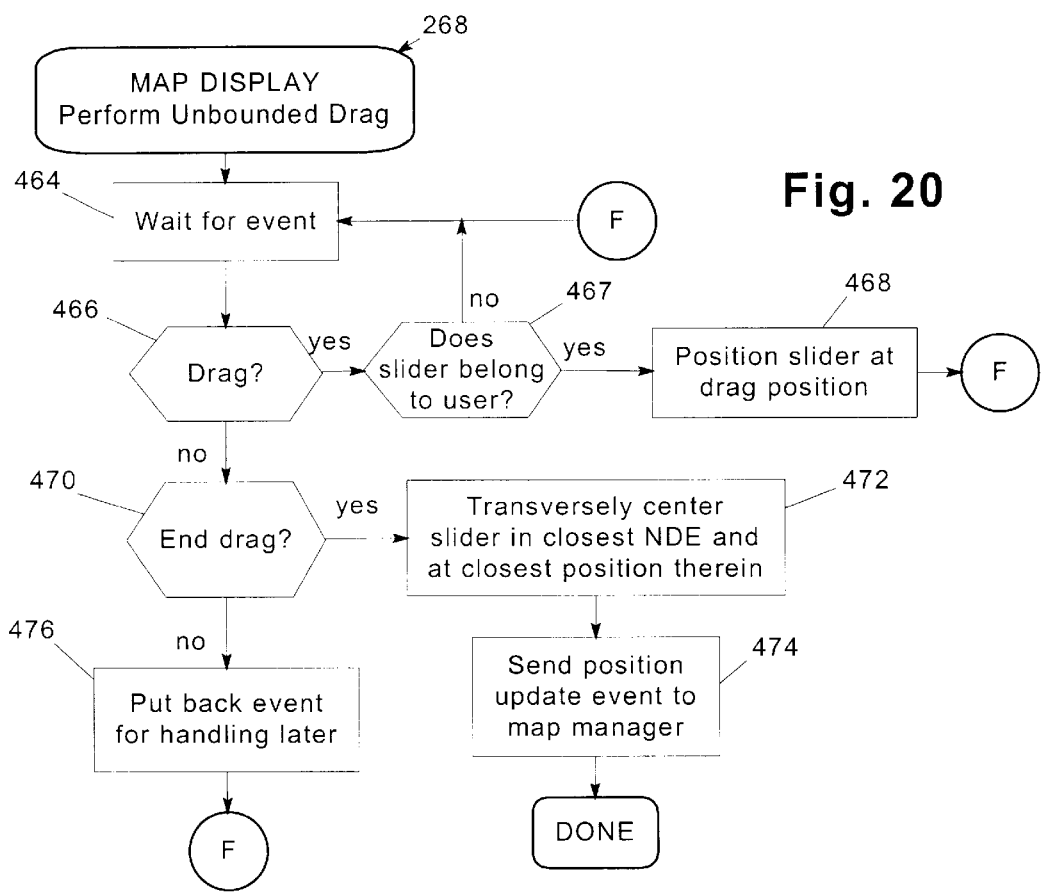
FIG. 20 is a flowchart illustrating the program flow of the perform unbounded drag routine of FIG. 8.

Returning to FIG. 8, an unbounded drag routine is executed in block 268 upon detection of an unbounded drag event in block 266. One suitable program flow for block 268 is illustrated in FIG. 20, where the map display first waits for an event at block 464 (this block may also be bypassed in the first pass through the routine). Next, if the event received is a drag event, block 466 passes control to block 467 to determine first whether the slider currently pointed to belongs to the user. If it does not, the event is discarded and control is returned to block 464.

If the slider does belong to the user, control is passed to block 468 to reposition the slider at the drag position, prior to returning control to block 464. Typically, multiple drag events will be passed to the map display as the end user continues to move the pointer with the mouse button held down, whereby the slider will move in conjunction with the movement of the mouse.

Upon receipt of an end drag event, block 470 passes control to block 472 to transversely center the slider in the closest node display element to the current position of the slider, as well as at the closest position within that node display element. In certain embodiments, it may also be desirable to prevent movement of the slider to a new node display element if the slider is not at least partially overlapping or within a predetermined distance from any node display element. Next, in block 474, a position update event is sent to the map manager, which may be handled by routine 226 of FIG. 17 as discussed above to coordinate the changes to the map display with the browsers and any other modules that rely on such information. Routine 268 is then complete.

Returning to block 470, if another event is received, this event is temporarily saved for later handling in block 476, and control is returned to block 464. Similar to routine 264, routine 268 operates to assume control of the map display so long as a drag event is in progress. In the alternative, the receipt of an event other than a drag event or end drag event may prematurely terminate the routine so that the event may be handled immediately.

It should be appreciated that the bounded and unbounded drag routines, as well as any other user-responsive routines disclosed herein, need not be responsive solely to mouse input. Instead, such routines may be responsive to other user input devices such as keyboards, touchpads, trackballs, etc., either in addition to or in lieu of a mouse. Moreover, such routines may involve different user actuation sequences, e.g., through setting a specific mode through a button, menu selection, etc., holding down a button, opening a pop-up menu, and other manners too numerous to mention. Furthermore, it should be appreciated that all conventional navigational features provided with browsers and the like may also be used in navigation, with the map display dynamically updated as the end user navigates in this manner.

In addition, it should also be appreciated that the node display elements may incorporate other control elements in addition to or in lieu of a scroll display element. For example, one or more arrow buttons may be provided at each end of a node display element to move a slider a predetermined amount (e.g., to scroll line-by-line through a document). Also, the area of the node display element outside of the slider may be utilized by an end user to scroll by a larger amount (e.g., to scroll screen-by-screen or page-by-page through a document).

It may also be desirable to permit an end user to click on a link display element or other button on the node display element to perform the operation of taking the associated link and bringing up the linked document in the browser. Such an operation may also be performed on a non-navigated link display element if display of such elements is enabled, whereby the processing thereof would occur in the manner disclosed above in process link routine 222 of FIG. 11.

Another useful feature is adding a new slider to a map display and opening a new browser associated therewith. Such an operation may be initiated in a number of manners, including but not limited to dragging and dropping a slider onto a node display element from a slider icon, selecting from a pop-up menu, double-clicking on a node display element, or opening a new browser window. For example, FIG. 1 illustrates multiple sliders 68a, 68b and 68c respectively in node display elements 62a, 62b and 62c. Sliders 68a, 68b and 68c are respectively associated with browsers 50a, 50b and 50c to display the contents of the documents associated with node display elements 62a, 62b and 62c. Moreover, it should be appreciated that multiple sliders may be located within the same node display element at any given time, such that multiple browsers display the contents of a given document, which may be useful, for example, in viewing large documents.

One manner of implementing the addition of a new slider is to execute the program flow described above for handling the "create map" event (see blocks 104–114 of FIG. 5) as part of the initialization of a browser window. Since the map display is currently active during this process, no additional map display is started. However, during this process the map registry and map manager handle the introduction of a new user to the active map display (see blocks 156–164 of FIG. 6 and blocks 206–216 of FIG. 7), thereby adding a slider to the map display corresponding to the new browser window.

It should also be appreciated that a suitable routine for removing a slider upon termination of a browser window may also be provided. Typically such an operation would be initiated by the browser during its termination flow, e.g., by passing an event to the map manager indicating that the browser is terminating. The map manager then discards the user of the map data structure for the browser and passes an event to all map displays associated with the map data structure. Each associated map display then removes the slider (user). In addition, if any associated map display has no more users, the map display itself may be terminated as well.

A number of additional features may be provided to assist an end user in identifying node display elements, which may be particularly useful for larger map displays. For example, as shown in FIG. 1, the map display may generate a "balloon" or pop-up window display element 71 in response to the node display element having focus as a result of an end user directing pointer 70 at that element. The pop-up window display may display the address or location (e.g., the URL) of the document associated with the node display element, a title or description thereof (optionally entered by an end user similar to a bookmark or favorite), and/or other information such as document size, the last date the document was accessed or updated, the creation date of the document, etc. In addition, any of such information may be persistently displayed for given node display elements in the alternative.

It may also be desirable to provide a map display search function so that an end user may be permitted to locate specific node display elements matching a predetermined search criteria, e.g., address, location, description, title, etc. In addition, it may be desirable in groupware environments to be able to search for other users of a map display.

Moreover, it may be desirable to provide additional visual indications within a map display to convey additional information relating thereto. For example, sliders and their associated browsers may be visually linked, e.g., through a common color or pattern or icon assignment so that an end user is able to identify which slider is associated with which browser. Other visual indications, e.g., through colors, patterns, icons, etc., may also be used to distinguish different node or link display elements, e.g., to identify more desirable paths, to indicate the frequency of "hits" to a node, etc. An end user may also be able to modify such visual indications manually as the end user desires.

In addition, as discussed above, it may be desirable to provide an end user with the option of selectively viewing a map display in an adjoining-type or non-adjoining-type representation, since each representation may have advantages over the other in the performance of different tasks. For example, an adjoining-type representation is generally more compact, thereby enabling an end user to view a greater portion of a map display. On the other hand, when it is desired to determine descendant relationships between various node display elements, the non-adjoining-type representation is generally more hierarchical and organized in nature.

Other navigational functions and user display features conventionally used in GUI systems may also be utilized in map displays consistent with the invention. For example, scroll bars, such as scroll bar 72 in FIG. 1, may be used to view different areas of a map display. In addition, a zoom function may be used to control the relative amount of the map display to view in the window at a time. Moreover, a magnify function may be used to bring up a second window or second region or frame in the same window to provide a magnified view of a given region of the map display, where a box or other indicator in the main window would indicate the area of the map display currently viewed in the second window.

It should be appreciated that a number of the above features are implemented in a similar manner to similar user interface components and features found in various conventional systems, and thus the implementation thereof in this context is well within the abilities of one skilled in the art. Moreover, it should be appreciated that a number of the above features are typically handled in responsive to events passed to the particular map display receiving the user input, similar to the bounded and unbounded drag events discussed above. Such features may also be handled at the level of a given display element in certain circumstances.

Map Maintenance

A number of other features may be desired to facilitate the usage of map displays consistent with the invention. For example, it may be desirable to enable map displays to be named and stored for later retrieval and use by the end user or by others. The later retrieval may be performed by selecting a given map display from a list of such displays provided to an end user, e.g., storing map displays as data files in one or more organized folders or directories and using an open dialog box to retrieve a given map display. Also, shortcuts to favorite map displays may be provided in a drop-down bookmark menu to permit an end user to retrieve a map display via the menu.

A number of editing functions may also be utilized to modify the visual appearance of a map display, particularly when a large number of node display elements have been added to the map display. For example, conventional clipboard-type operations may be utilized to cut, copy and paste node display elements with or without their descendants to and from a clipboard.

A "grafting"-type function may be utilized to permit an end user to change a link to a different point in the map display, typically either through a drag-and-drop operation or a clipboard-type cut-and-paste operation. Grafting permits an end user to shape or organize a map display as he or she sees fit, and may help in maintaining symmetry and/or maintaining the map display within the smallest region possible.

Grafting may also be utilized to add "virtual links" between node display elements whose underlying documents are not actually linked, so that an end user may navigate between the related documents even though no actual link exists therebetween. As one example, may permit some subject-specific map displays to be organized in a more useful and coherent manner. In the alternative, virtual links may not be permitted, whereby an error message or audio alert may be signaled to an end user indicating rejection of the graft attempt by the system.

Also, as illustrated by icon 76 of FIG. 1, an iconize, or minimize, function may be provided to permit an end user to selectively replace groups of descendant node display elements with an icon. Unfrequently used paths may be minimized, for example, to reduce the size of the map display, whereby an end user merely maximizes the icon when any such paths need to be used. Also, node display elements related to common subject-matters may be grouped together and minimized so that an end user maximizes only the node display elements related to a given subject matter. Minimization and maximization may occur, for example, by double-clicking on a node display element or the icon representative thereof.

An end user may also be permitted to delete selected node display elements, typically along with all of their descendants. Consequently, unused or infrequently used node display elements may be removed to reduce the overall size of the map display.

An end user may also be permitted to create a new map display with an existing node display element used as the root node display element of the new map display. Moreover, any descendant node display elements may or may not be incorporated into the new map display. For example, as shown in FIG. 1, an end user may drag and drop a given node display element to a "planting pot" icon 74 to create a new map display in a separate window. The creation of the map display may be performed in the same manner as a new map display is created by the browser as discussed above in relation to FIGS. 5–9. It should also be appreciated that a given window may also display more than one map display if desired.

Various map display rearranging features may also be provided to permit an end user to modify the arrangement of node display elements in a map display. For example, in the adjoining-type representation of FIG. 1, it may be desirable to manually rotate or resize node display elements to mold the map display as an end user desires. In the non-adjoining-type representation of FIG. 2, it may be desirable to be able to move node display elements to different locations, whereby the link display elements therebetween are resized and/or rotated to maintain the visual link between linked documents. In other representations, any combination of these rearrangement techniques may be used. For example, a chain of node display elements may skew a display in one direction. By rearranging node display elements, the shape of the map display may be molded. This may be useful, for example, to arrange a relatively more important chain of node display elements into a primary artery or trunk, with relatively less important node display elements extending off of the trunk.

Other maintenance functions may be implemented in map displays consistent with the invention. It should also be appreciated that many of the above maintenance and editing functions may be adapted from various conventional file and database management processes. Moreover, implementation of these functions through mouse or other user input may be adapted from related conventional GUI techniques. Consequently, the implementation of such functions is well within the abilities of one skilled in the art.

A number of additional enhancements to the aforementioned map displays are disclosed in greater detail below. It should be appreciated, however, that each of these enhancements may be utilized alone or in conjunction with other enhancements and variations disclosed herein.

Cache Status Indication

It should be understood that in applications such as browsing hypertext documents on the Internet and the like, previously visited documents may get cached-out, or removed, as new documents are retrieved. In particular, many web browsers for example maintain a memory and/or hard disk cache of documents so that when an end user returns to a cached document, the document is retrieved from the cache rather than from its original source. The cache typically is a fixed size, or may be allowed to use a variable amount of storage space up to a maximum allocated size. Regardless, it is not uncommon for least recently used documents to get cached out (removed) to make space for new documents. The use of a cache can significantly increase performance since the access time for a memory or a local storage device may be several orders of magnitude shorter than an external network, often due to bandwidth limitations and/or network traffic. However, in some instances a cached copy of a document may not be used, e.g., if the document has been updated since the last cached copy was obtained.

When an end user is accessing linked records such as hypertext documents, it may be beneficial for an end user to know which documents are or are not cached. For example, an end user may not have a lot of time to browse for information, and thus may wish to avoid retrieving any documents from an external source. Thus, map displays consistent with the invention may also include a cache status indicator that indicates a cache status for each node display element therein.

For example, FIG. 21A illustrates a non-adjoining-type map display 500 having node display elements 502–516. In this embodiment, the cache status indicator for each node display element is the outline or border of the element itself—with a solid line indicating a cached document (e.g., for node display elements 502, 504 and 506) and a dashed line indicating a cached out (or non-cached) document (e.g., for node display elements 508, 510, 512, 514 and 516). Similarly, for an adjoining-type map display 520, node display elements 522, 524, 526 and 528 are illustrated as cached documents, while node display elements 530, 532 and 534 are illustrated as cached out documents.

It is anticipated that each node display element may have associated therewith a cache status variable or flag that is selectively set or reset by the processes handling the retrieval and caching out of documents. Display of the cache status of each node may be accomplished during a refresh of the map display, e.g., during the program flow represented by blocks 258–260 of FIG. 8. Refresh may be performed only in response to updates to the map display, or alternatively, may be periodically initiated when no activity has occurred for a predetermined time so that the cache status of each node display element may be updated. Alternatively, a refresh may be initiated whenever documents are cached in or out.

In addition, in groupware-type environments, it should be appreciated that documents may be cached for some end users but not for others. Accordingly, in such environments, block 259 of FIG. 8 may be required to search an end user's cache to determine the cache status of each node display element, rather than relying on a flag stored in the map data structure therefor.

Other manners of distinguishing cached and non-cached documents may also be utilized. For example, different colors, patterns, shades, borders, etc. may be used as cache status indicators to distinguish the node display elements for cached and non-cached documents. Also, separate display elements such as icons or alphanumeric indicators may be used to identify such documents. Moreover, a cache status indicator may be persistent, or may be selectively displayed, e.g., when the pointer passes over a node. Other variations will be apparent to one skilled in the art.

The provision of a cache status indication for selected node display elements also provides a mechanism by which an end user can selectively retrieve and/or cache out selected documents. Selective retrieval and/or caching out may be performed either on documents associated with individual node display elements, or on documents associated with the sub-maps formed by individual node display elements and all of their descendants. Caching out operations on sub-maps or individual node display elements may be useful for controlling which documents are stored in the cache. For example, it may be desirable to cache out infrequently used documents to free up room in the cache so that more desirable documents are less like to get cached out during browsing. Also, a retrieval operation on a sub-map (which may be the same as the entire map display) may be useful as an off-line browsing tool, where an end user can initiate a retrieval of multiple documents at once, then perform other tasks until all documents have been cached.

For example, FIG. 21B illustrates two exemplary retrieval requests for map display 500. First, retrieval of the document associated with node display element 508 individually is illustrated, whereby the document for the descendant node display element 510 thereto is not retrieved. Second, retrieval of the sub-map rooted at node display element 512 is illustrated, whereby the documents for the descendant node display elements 514, 516 thereto are also retrieved.

Any number of user interface mechanisms may be utilized to perform retrieval and caching out. For example, suitable pop-up menu selections may be provided when an end user clicks on a node display element, or documents associated with particular node display elements may be retrieved or cached out in response to double or single mouse clicks thereon (typically when a distinct cache mode is selected). As with other user actuated functions disclosed herein, the mouse clicks may be performed in conjunction with other activities, e.g., holding down a shift or control key.

It may also be desirable to select multiple node display elements and perform a multi-node retrieval or cache out operation on all of the documents associated therewith. The general process of selecting multiple node display elements for the performance of a multi-node operation is discussed below in relation to FIGS. 31–33.

When multiple node display elements are selected, either as a sub-map or as a multi-node group, caching out, or more importantly, retrieval of the documents associated therewith may occur serially or in parallel (e.g., via multiplexing). Moreover, these alternate modes may be selectable by an end user. For a sub-map, the order may proceed in a top-down fashion. For a multi-node group, the order in which documents are retrieved or cached out may be top-down, or may be based upon the order in which the associated node display elements are selected. Other variations will be apparent to one of ordinary skill in the art.

It should be appreciated that maintenance of a document cache and the operations associated therewith are conventional in nature, and thus, incorporation of such functions into map displays to operate in response to the user input mechanisms disclosed herein is within the abilities of one skilled in the art.

Retrieve Progress Indication

In conjunction with the retrieval and caching out of documents, it may be desirable to provide an end user with status information regarding the progress of such operations. Retrieval operations in particular may take from a few seconds to several minutes, depending upon factors such as the size of the document(s) being retrieved, the bandwidth of the retrieval path, and network traffic, if any. Conventional browsers and the like may include progress indicators that indicate the progress of such operations, typically in the form of conventional progress bar or slider display elements that move from left to right as an operation proceeds, and/or an alphanumeric indicator such as the percentage of an operation that has been completed.

Map displays consistent with the invention may provide similar retrieve progress display elements that are associated directly with display elements in the map displays such that the progress may be visually tied to the associated node display elements being retrieved. For example, as illustrated by non-adjoining-type map display 540 of FIG. 23, a retrieve progress display element may take the form of a slider 548 that is animated to move along the connector 546b of a link display element 546 as a link is taken from a first node display element 542 to a second node display element 544. The position of slider 548 is determined by the relative completion, or the progress, of the retrieval operation for node display element 544. While element 544 is illustrated as being initially cached out, it should be appreciated that the progress of a retrieval from the cache may utilize a similar progress indicator, although the retrieval time may be significantly shorter. The retrieval may also optionally be considered to incorporate the rendering time for the document in the browser if desired.

To implement a retrieve progress display element in the illustrated embodiment, the map display typically must receive periodic updates from the associated browser so that a current indication of the progress of retrieval may be maintained. As shown in FIG. 8, this may be accomplished, for example, using a "status update" event in the map display program flow that is detected in block 272 and handled in block 274 such that the display is refreshed with the current status of the document being retrieved. Such an event may be initiated in any of a number of manners, e.g., during the program flow of the browser in processing a link (see block 119 of FIG. 5).

A wide variety of alternate retrieve progress display elements may be used in the alternative. For example, an alternate non-adjoining-type map display 550 is illustrated in FIG. 24, where a retrieve progress indicator 558 takes the form of a bar 558 that is fixed at an end proximate node display element 552 and that grows along connector 556b of link display element 556 toward node display element 544 to show the progress of the retrieval of the document associated with element 544.

As another example, FIG. 25 illustrates an adjoining-type map display 560 in which a retrieve progress display element takes the form of a bar 556 that grows along the length of node display element 564 as element 564 is retrieved from the end thereof linked to node display element 562. In the alternative, a slider-type retrieve progress display element may also be used in this embodiment. Moreover, the retrieve progress display element may fill in or otherwise modify the appearance of node display element 564, e.g., progressively changing the outline of the element to reflect its change from a non-cached to cached element.

Typically, a retrieve progress display element provides an animation that moves in the direction that a link is taken or that a subsequent retrieval operation is occurring. Consequently, when a reverse link is taken, e.g., when a "back" button is pressed on a browser, the animation of the retrieve progress display element may move in the opposite direction to that shown in FIGS. 23–25. In the alternative, a retrieve progress display element may provide other representative animations, e.g., filling transversely to simulate the filling of a container with fluid, growing inward from both ends of a display element to meet in the middle thereof, growing outward in both directions from a center point of a display element, among others.

The movement of a retrieve progress display element in the direction in which retrieval is occurring or a link is taken also provides an interesting visual effect to the end user when multiple documents, e.g., from an entire sub-map, are being retrieved, since multiple retrieve progress display elements may be used concurrently. As documents are retrieved serially or in parallel, the retrieve progress display elements appear to spread out across a map display as more and more documents are retrieved. From such an effect an end user may also be able to determine which documents receive priority and which take the longest to retrieve. This information may be used, for example, to prioritize the retrieval of multiple documents to provide the most efficient usage of a map display.

Also, the use of separate retrieve progress display elements for individual documents being retrieved enables an end user to identify specific retrieval operations that have stalled or that are taking too long to complete. Through user selection of a node, e.g., through a mouse click or pop-up menu, an end user may be able to terminate a retrieval of a specific node, rather than terminating multiple retrievals at once.

With all of the above examples, the retrieve progress display elements typically move in a linear fashion. However, as illustrated by adjoining-type map display 570 in FIG. 26, a retrieve progress display element may take other forms such as a pie-shaped indicator 578 that is anchored on a link display element 578 coupling the node display element 574 being retrieved to a linking node display element 572. Also, a retrieve progress display element may further include an alphanumeric indicator such as indicator 579 that provides a percentage completion figure, or alternatively, a time to completion or elapsed time indication.

Other retrieve progress display element designs may be used in the alternative. Moreover, it should be appreciated that retrieve progress display elements consistent with the invention may be implemented using conventional progress display elements utilized in many GUI environments, and thus such implementation is within the abilities of one skilled in the art.

Automatic Map Display Generation Utilizing Search Criteria

An additional useful feature that may be implemented with user interface components consistent with the invention is that of automatic map display generation based upon a search criteria selected by an end user. With this feature, an end user may select a search criteria from which a new map display, or part of an existing map display, is generated showing documents that meet the search criteria. For example, if an end user is currently visiting a "garden" site on the Internet that has many links to suppliers of flowers, the end user may be able to select "purple cone" as the flower for which to build a map display. Upon generation of a map display, all sites that refer to "purple cone" flowers may be found.

With this feature, node display elements associated with searched documents are typically generated dynamically to build a map display therefrom. In the alternative, documents associated with existing node display elements may be searched in lieu of or in addition to documents that are not currently represented in the map display.

An important aspect of this feature is that intermediate documents located between matching documents that match the search criteria are nonetheless retrieved and added to a map display to illustrate the navigation path to matching documents. These intermediate documents, however, are differentiated from matching documents through a visual or graphical representation.

Another important aspect of this feature is that the depth from which to perform a search, i.e., the number of links to take from a given root node. This may enable more focused searching to be performed as desired. For example, an end user may select a depth of only 2–4 levels, then based upon the results, perform additional searching starting at matching documents found in the prior searching.

Moreover, it should be appreciated that, once a map display is created, it may be maintained, e.g., via rearrangement, deletion of node display elements, etc. as desired.

Generation of a map display based upon a search criteria is typically initiated by an end user within a map display, as illustrated by receipt of an auto-build event at block 270 of FIG. 8. Initiation may occur, for example, through a menu bar, pop-up menu, toolbar button, etc. Initiation may also occur through a browser window using similar user actions, whereby the auto-build event is generated by a browser. Upon receipt of such an event, control passes to handle the event with a search based map display generation routine illustrated at 600.

Figure 27:
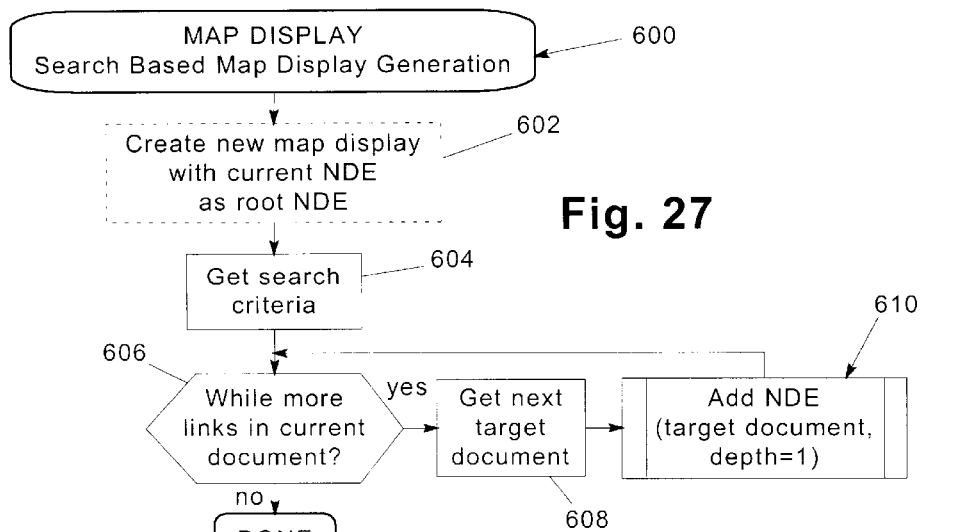
FIG. 27 is a flowchart illustrating the program flow of the search based map display generation routine of FIG. 8.

Routine 600 is illustrated in greater detail in FIG. 27. First, as illustrated by optional block 602, a new map display may be created with the current node display element as the root of the new map display. In the alternative, added node display elements may descend from the current node display element in an existing map display. Execution of this block may be selectable by an end user, e.g., by selecting a given mode for the map display. It should be appreciated that, if a new map display is created, a program flow similar to that initiated by block 102 of FIG. 5 may be executed to create the new map display. Furthermore, the remaining program flow in routine 600 starting at block 604 would then be executed by the new map display.

Next, in block 604, a search criteria is retrieved from an end user, e.g., through a dialog box or similar user input. It should be appreciated that various searching algorithms, including filtering, keyword searching, field searching, boolean searching, natural language searching, etc. may be used to obtain a suitable search criteria. Examples of the type of information that may be searched includes document contents, document title, document description, document size, document address or location, date last updated, and/or date created, among others. In general, a wide variety of known searching algorithms may be utilized consistent with the invention.

Next, in blocks 606–610, each link in the current document is processed to locate matching documents for the given search criteria. As long as additional untraversed links exist in the current document, block 606 passes control to block 608 to retrieve the target document for the next un-traversed link, then an add NDE routine 610 is executed to determine whether to add a node display element for the target document. Once all links in the current document are traversed, block 606 terminates the execution of routine 600.

Figure 28:
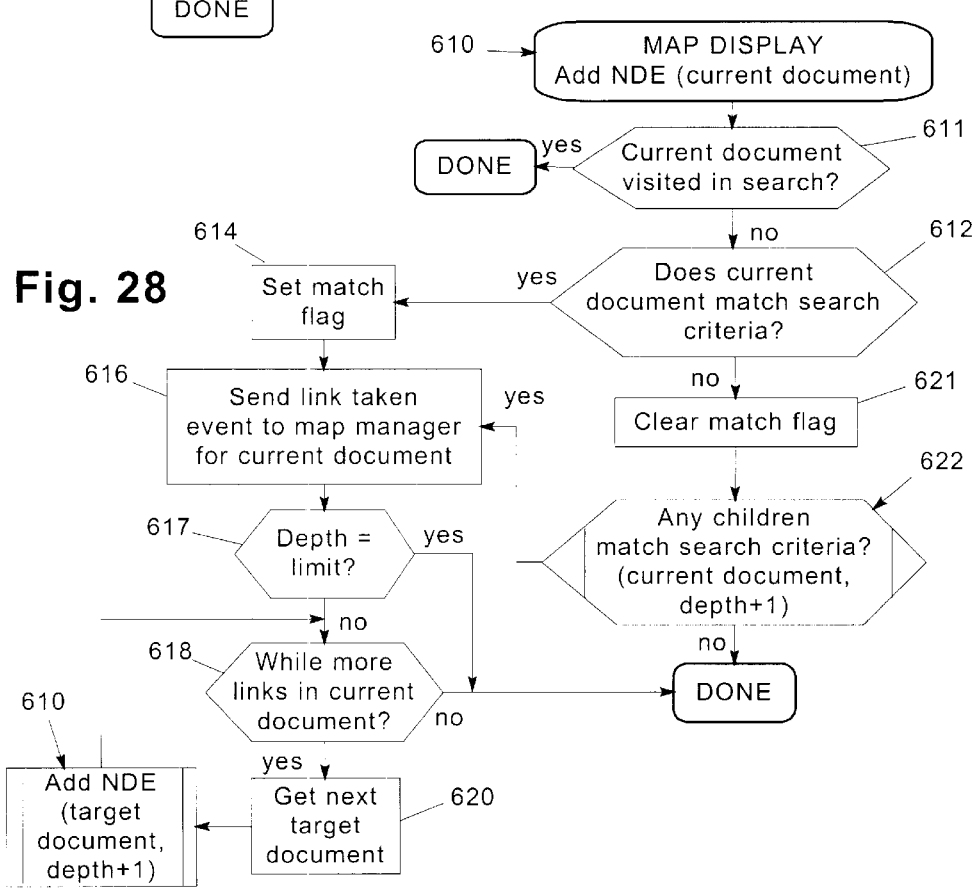
FIG. 28 is a flowchart illustrating the program flow of the Add NDE routine of FIG. 27.

The add NDE routine 610 is illustrated in greater detail in FIG. 28. This routine is passed from its calling routine the contents of, or a pointer to, a current document. For example, when called from routine 600, the next un-traversed target document is passed to routine 610. This routine is also passed a depth variable, representing the number of "levels", or sequential links from the root node display element, that the current document is from the root node display element. As mentioned above, an end user may wish to optionally limit the depth of a search. Moreover, regardless of whether an end user limits the depth, a system depth limit is typically set so that the search eventually terminates. Initially, when called from routine 600, the depth is set to one.

First, block 611 determines whether the current document has been visited in this search, typically performed by maintaining a list of visited documents. If so, routine 610 is terminated for this document.

If not, the current document is searched in block 612 to determine whether it meets the search criteria. If so, control passes to block 614 to set a match flag for the current document. Next, in block 616, a link taken event is sent to the map manager so that the map manager dynamically adds a node display element to the map display for the current document, e.g., using the program flow initiated at block 218 of FIG. 7. In addition, the map manager is passed the contents of the match flag so that the map manager can indicate on the new node display element the matching status of the current document.

The matching status of a document may be indicated in a number of manners on the node display element associated therewith, typically using a matching status indicator associated with the node display element. For example, a matching status indicator may include a color indicator, a pattern indicator, a border indicator, an icon indicator, an alphanumeric indicator, or combinations thereof. Also, a matching status indicator may be applied to node display elements for non-matching documents in lieu of or in addition to, matching node display elements, e.g., by displaying non-matching node display elements with a faded color or "grayed out" appearance, replacing non-matching node display elements with icons or representing them as link display elements, etc.

Next, in block 617, the depth variable is compared to the depth limit. If the depth variable is greater than or equal to the depth limit, no further searching in descendant documents is necessary, and routine 610 is terminated. If, however, the depth variable is less than the depth limit, a while loop is initiated in block 618 to process each link in the current document. In block 620, the target document for the next un-traversed link is retrieved. Next, the add NDE routine 610 is recursively called, passing the target document, as well as the depth variable incremented by one. Once all links are traversed, routine 610 terminates. In this manner, each document within the number of sequential links permitted by the depth limit is searched.

Returning to block 612, even if the current document does not match the search criteria, additional searching is performed to determine if any descendant documents therefrom match the search criteria. Control is this instance is passed to block 621 to clear the match flag and thereby indicate that the current document is a non-matching document.

Figure 29:
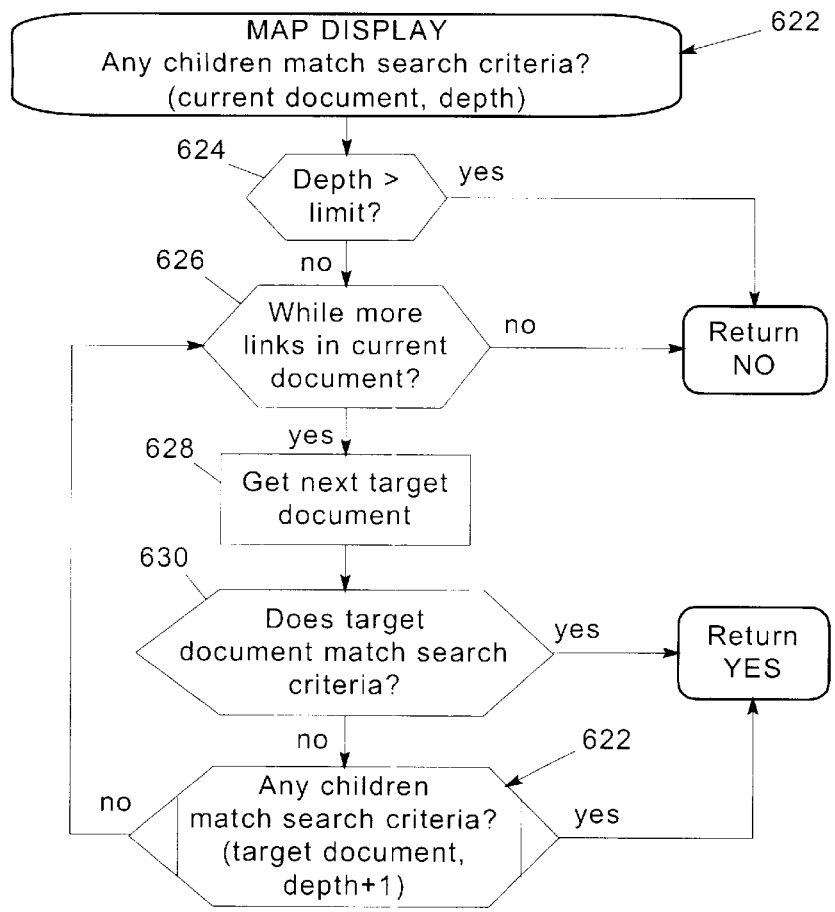
FIG. 29 is a flowchart illustrating the program flow of the any children match search criteria? routine of FIG. 27.

Next, an any children match search criteria? routine 622 is executed to analyze the descendant documents to the current document. Routine 622 is illustrated in greater detail in FIG. 29, where the routine receives the contents of or a pointer to the current document from routine 610, as well as an incremented depth variable.

First, in block 624, if the depth exceeds the depth limit, a "no" result is returned to block 610. If not, control passes to block 626 to initiate a while loop that analyzes each link in the current document. For each un-traversed link, the target document therefor is retrieved in block 628 and compared to the search criteria If the target document matches the search criteria, a "yes" result is returned. If not, routine 622 is recursively called with the target document as the new current document, and with the depth variable incremented by one. A "no" result is returned if no target documents match the search criteria. In this manner, each descendant document from the current document that is still within the depth limit is searched.

Returning to FIG. 28, if a "yes" result is returned from routine 622, indicating that at least one descendant of the current document (within the depth limit) matches the search criteria, control is passed to block 616 to dynamically generate a node display element for the current document. Moreover, as this document itself is non-matching, the cleared match flag information is sent to the map manager to indicate this non-matching status on the map display. If a "no" result is returned from routine 622, routine 610 terminates and a node display element for the current document is not added to the map display.

Figure 30:
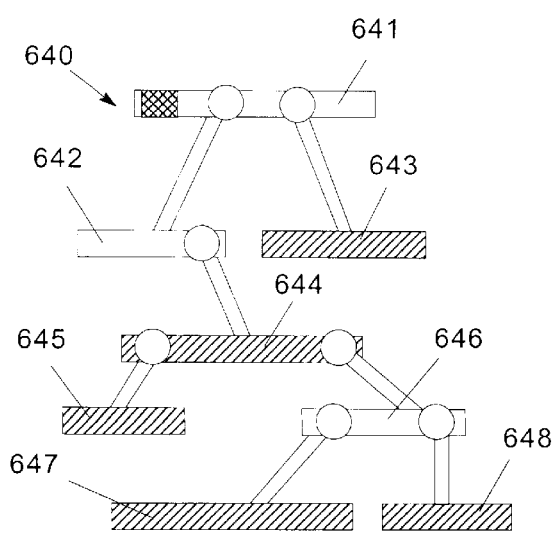
FIG. 30 is a block diagram of an exemplary map display generated by the routines of FIGS. 27–29.

As an example of the operation of the routines discussed above, FIG. 30 illustrates an exemplary map display 640 generated with a root node display element 641 and a depth limit set at four. For map display 640, node display elements 643, 644, 645, 647 and 648 are shown as matching node display elements, while node display elements 642 and 646 are shown as non-matching node display elements, but which are intermediate to descendant node display elements within the depth limit. Non-matching node display elements not having matching descendant node display elements within the depth limit are not added to map display 640.

Alternate manners of representing matching and/or non-matching node display elements may be used in the alternative.

Multi-Node Operations

Figure 31:
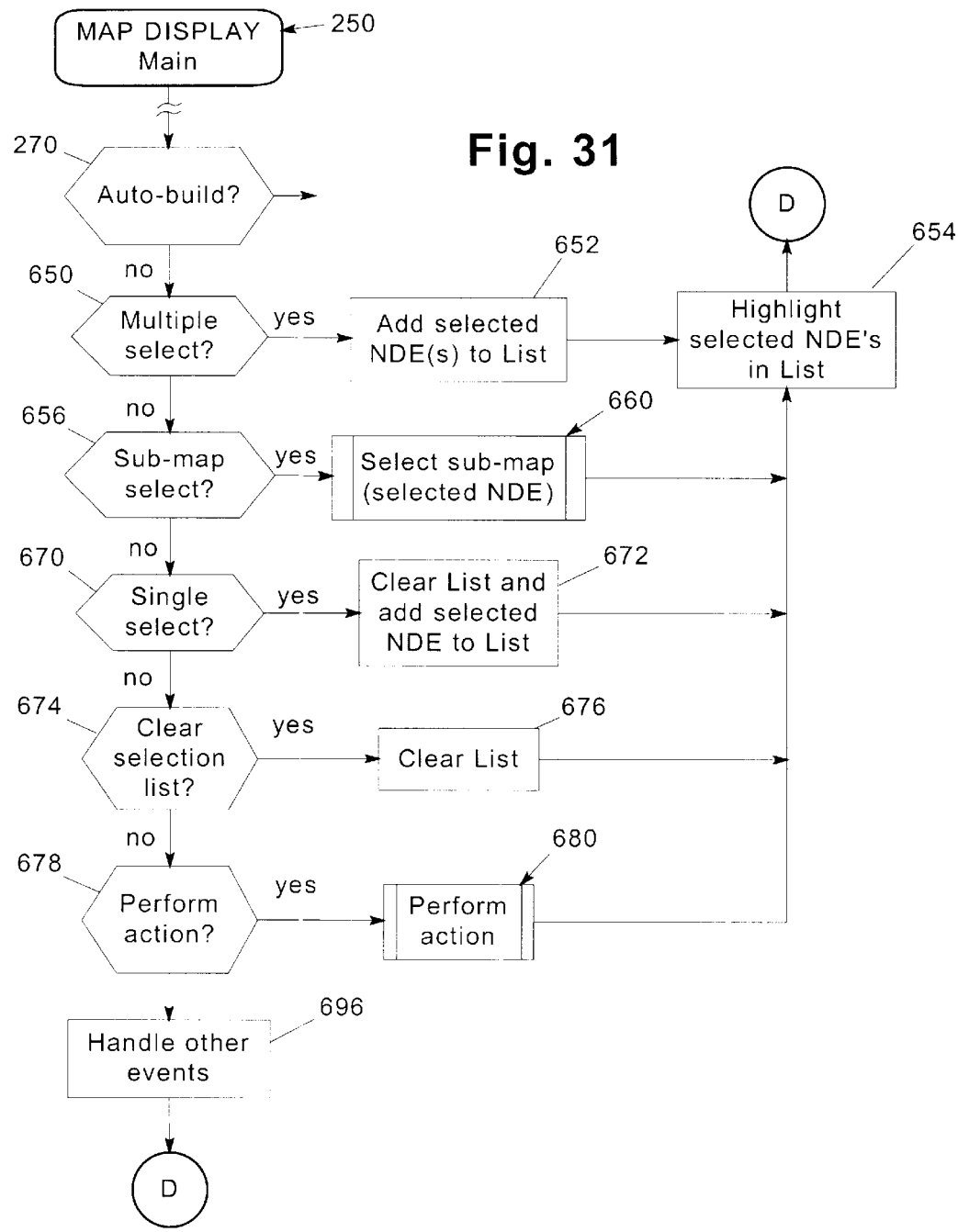
FIG. 31 is a flowchart illustrating additional event handling routines for the map display of FIG. 8.

As discussed above, it may be desirable to perform common operations on the documents associated with multiple node display elements using a graphical selection mechanism. For example, FIG. 31 illustrates the handling of several additional selection-related events by a map display in the main routine 250 thereof. Other events, unrelated to selection or common operation on node display elements, are represented at block 696.

Each selection event operates on a selection list that includes one or more selected node display elements. In addition to which node display elements are included in a selection list, additional information, such as the order in which the node display elements were selected, or the relative hierarchical level of the selected node display elements, may also be stored.

For example, as illustrated by block 650, a multiple select event may be received and handled at block 652 to add the selected node display element or elements to the selection list. Next, in block 654, the selected node display elements in the list are highlighted in the map display, typically by setting a selected status flag for such node display elements and executing a display event to redraw the map display. A selected status may be indicated by any number of visual representations, such as a selected status indicator related to the node display element and including a color indicator, a pattern indicator, a border indicator, an icon indicator, an alphanumeric indicator, or a combination of one or more of the same.

Multiple selections may occur, for example, through an area select operation whereby the mouse is clicked when pointing to an open area, then a box is dragged across a desired area to select all node display elements within the boundaries of the box once the mouse button is released. An additional manner of performing multiple selections is to click a mouse button on a node display element while holding down a key (e.g., shift or control). In a Windows-type environment, for example, a shift-mouse click selects each element between a current element and the clicked element, while a control-mouse click selects the clicked element. Other GUI environments typically have similar mechanisms that may be actuated through other mouse-keyboard combinations. Multiple selections may also be performed by setting a specific mode such that each mouse click adds the clicked element to the list. In addition, multiple selections may be performed through dragging an icon or marker onto each selected node display element. Other manners of selecting multiple elements and/or extending a selection may also be used.

Another selection event is a sub-map select event, detected at block 656 and handled by a recursive select sub-map routine 660. The sub-map select event is typically initiated in response to selection of a root node display element from which an end user wishes to select that node display element and all of its descendants. For example, an end user may select a sub-map through a pop-up menu, menu bar selection, a toolbar button, or through a special mode selection.

Figure 32:
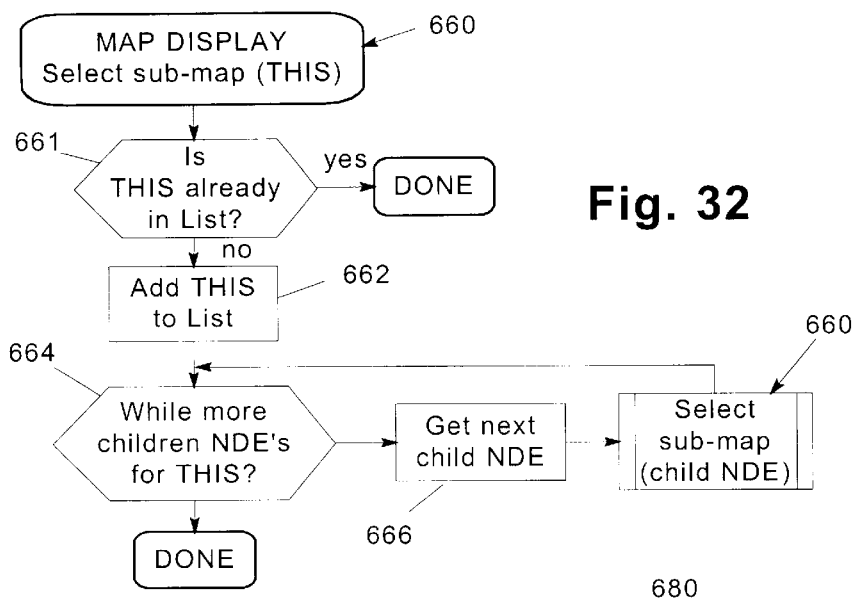
FIG. 32 is a flowchart illustrating the program flow of the select sub-map routine of FIG. 31.

Routine 660 is illustrated in greater detail in FIG. 32, and is passed the contents of or a pointer to a node display element, THIS. When called upon receipt of the submap select event at block 656 of FIG. 31, routine 660 receives the selected node display element from which the event was generated. First, block 661 determines whether the THIS node display element has already been visited in the current sub-map selection operation, typically by accessing the selection list. If it has, routine 660 is simply terminated, as no further processing of THIS is required.

If not, the THIS node display element is added to the selection list in block 662. Then, in blocks 664 and 666, a while loop is executed to retrieve each child node display element relative to THIS. For each such element, select sub-map routine 660 is recursively called with the element passed as a parameter. In this manner, the entire sub-map relative to a selected node is added to the selected list.

Returning to FIG. 31, a single select event is detected at block 670 and is handled at block 672. In response to a single selection, the list is cleared and the selected node display element is added as the only member of the list. Such an event may occur, for example, in response to an end user clicking on a node display element without holding down the shift or control key, and without the map display being in a multiple selection mode.

A clear selection list event is detected at block 674 and is handled at block 676 to clear the selection list. This may occur, for example, in response to an end user clicking on an area or other element than a node display element. The event may also be initiated in response to another selection event that is not a selection extending type of event.

The above-described selection mechanisms are not the exclusive manner of generating a selection list for a map display. Any number of additional conventional selection mechanisms may also be used consistent with the invention.

The general manner of handling a common operation is shown in FIG. 31, where a perform action event is detected at block 678 and handled by a perform action routine 680. Any number of common operations, including caching and/or retrieval of documents, printing documents, storing documents, editing documents, etc., may be performed on the selected node display elements. Moreover, common operations on selected documents may also include performing operations on the associated node display elements, e.g., deleting, moving, rearranging, or highlighting selected node display elements, etc. Initiation of such events may be performed in any of the user input actions that have been described above.

Figure 33:
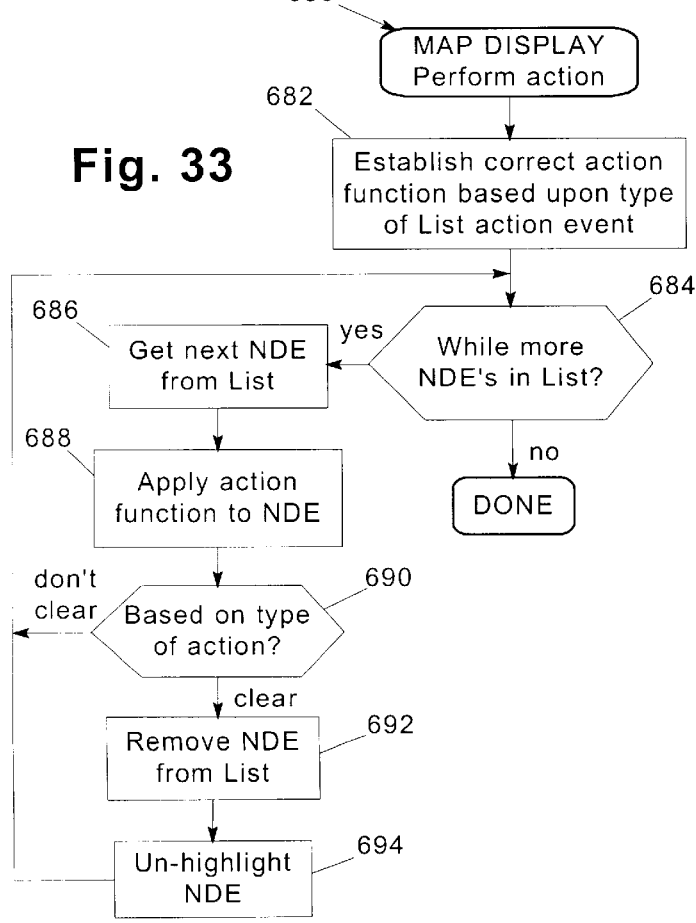
FIG. 33 is a flowchart illustrating the program flow of the perform action routine of FIG. 31.

Routine 680 is illustrated in greater detail in FIG. 33. First, in block 682, the correct action function is established based upon the type of event received. Next, in block 684, a while loop is executed for each node display element in the selection list. Each element is sequentially obtained from the list in block 686, and the established action function is applied to this node display element in block 688.

Selection of the next node display element in a list may be based on a number of criteria. For example, selection may be based upon the order in which the node display elements were selected by an end user. In the alternative, selection may be based on hierarchical concerns, whereby parent node display elements are operated upon prior to their descendants. In addition, it should be appreciated that each node display element may be processed sequentially, e.g., by the same execution thread. In the alternative, "concurrent" processing may be performed, whereby the node display elements are operated upon as a group within the same execution thread, or are operated upon in separate execution threads that execute in parallel with one another.

Next, if the action specifies that acted-upon node display elements be cleared from the selection list, block 690 passes control to blocks 692 and 694 to remove the node display element from the selection list and un-highlight the node display element, prior to acting upon the next node display element in the selection list. Otherwise, if the list is not to be cleared, control is passed from block 690 back to block 684 to handle other node display elements in the list.

Examples of actions that may require clearing of a list include deleting node display elements and retrieving documents, among others. Actions in which it may be useful to maintain the selection list include printing documents, as it may be desirable to maintain a selection after printing is complete.

While the above-described selection mechanism and action handling routines may be used for any of the above common operations, not to mention other operations not specifically mentioned herein, two specific operations, that of retrieving documents and printing documents, are described in greater detail herein.

Retrieving multiple documents is discussed above with reference to indicating a cache status for node display elements. The order in which documents are retrieved may be selected by an end user through the order in which node display elements are selected, or through a hierarchical process. Moreover, retrieval may occur in sequence or in parallel. Furthermore, cache status indicators and/or retrieval progress display elements may be used to enhance the visual effect of the retrieval progress of the selected documents. Other alternatives will be apparent to one skilled in the art.

The above-described multi-node selection and operation routines have particularly beneficial usage in printing multiple documents referenced in a map display. In general, the chaining together of multiple documents and generation of a single print file is known in the art. However, the flexibility by which multiple documents may be selected, ordered, and printed through the map display user interface component provides substantial benefits to an end user.

Figure 34:
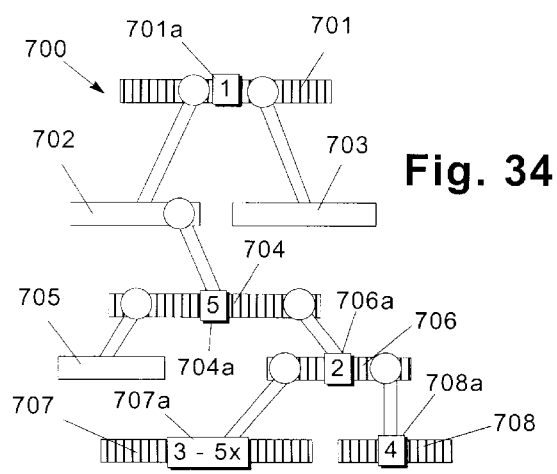
FIG. 34 is a block diagram of an exemplary print map display consistent with the invention.

For example, as shown by FIG. 34, a map display 700 may be configured as a print map by selecting one or more of node display elements 701–708 (e.g., node display elements 701, 704, 706, 707 and 708 are shown selected). As discussed above, node display elements may be selected one at a time, or as groups such as sub-maps. In the exemplary map display 700, the order of selection is illustrated by order indicators, e.g., indicators 701a, 704a, 706a, 707a and 708a, that illustrate the print order for the selected node display elements. Ordering may also be hierarchical in the alternative, or an end user may be able to select the order after the node display elements are selected.

In addition, as illustrated by indicator 707a, it may be possible for an end user to specify the number of copies of each document to print (here, five copies of the document associated with node display element 707). Selection of multiple copies may be made through clicking multiple times on a node display element, through a menu bar selection or pop-up menu, or in other known manners.

It may also be desirable to be able to name and save a print map, that is, to save the selection status, selection order, and/or number of copies, so that a print map may be stored and/or distributed to others in much the same manner as a map display. This would permit, for example, an end user to distribute a print map to other participants of a project or meeting such that the participants can print out the documents suggested by the end user, rather than having the end user distribute copies of each document. This also would permit, for example, an end user to store different print views of the same map display, e.g., print overview, print all, or print selected chapters.

Furthermore, it may be desirable to permit an end user to save soft copies of the selected documents and store such documents with the print map, e.g., in HTML. Consequently, an end user would then be able to distribute both the documents themselves, and the desired organization thereof, to others, without requiring others to retrieve the documents referenced by the selected node display elements in the print map.

Other uses and modifications will be apparent to one skilled in the art.

User Interface Component with Elastic Boundary

An additional feature that may be implemented with user interface components consistent with the invention is that of providing an elastic boundary that facilitates navigation with one or more scroll bar display elements. In particular, when navigating between node display elements, or in general within or between any individual scroll bars, an end user typically drags a slider with a mouse (e.g., during a bounded drag). However, an end user may occasionally inadvertently navigate between elements (i.e., traverse a link) when the end user actually desires to remain within the same element, principally due to difficulties in accurately dragging a display object with a mouse. An inadvertent traversal may significantly impact an end user's efficiency, as the end user typically must wait for the element to be retrieved, and then must traverse back to the original element and essentially end up where the end user initially desired to be. This problem is exasperated when retrieval of an element entails downloading a document from an external source such as the Internet. For example, it may take several seconds or even a few minutes to download a hypertext document from the Internet over a conventional dial-up connection.

Figure 35:
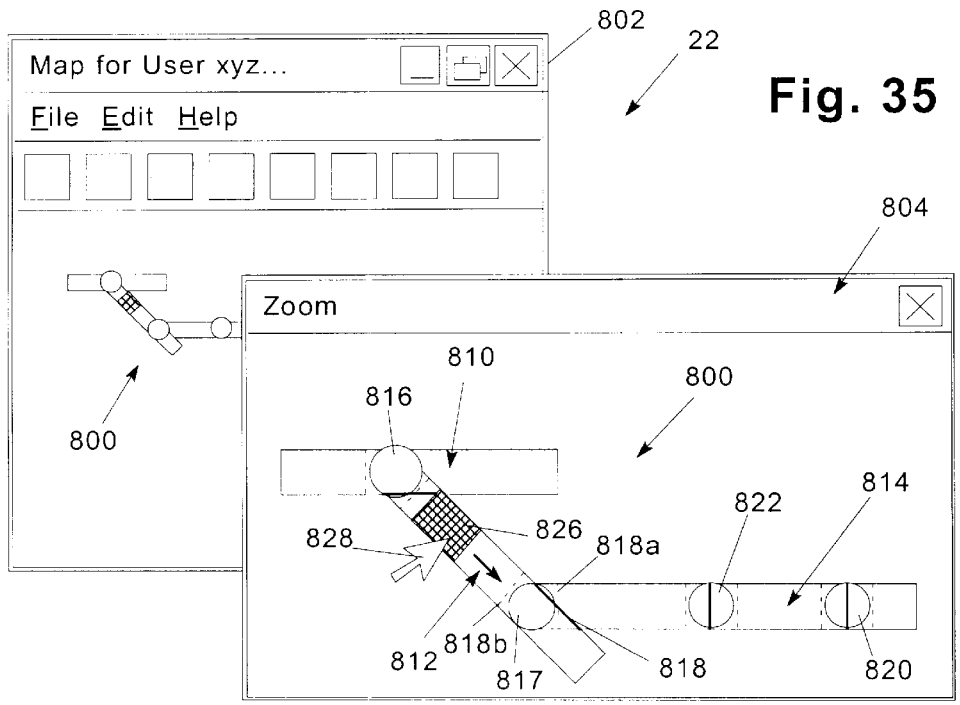
FIG. 35 is a block diagram of a representative computer display upon which is illustrated an adjoining-type map display and associated zoom window wherein elastic boundaries are provided between node display elements.

For example, as shown in FIG. 35, a map display 800 may be displayed on computer display 22, including node display elements 810, 812 and 814, with link display elements 816 and 817 therebetween. In addition, internal system links, e.g., links 820, 822 in node display element 814, may also be provided, e.g., to define internal hypertext links within the document associated with node display element 814, or to define internal breaks in the document such as screen breaks, page breaks, chapter breaks, section breaks, etc.

A boundary 818 exists between node display elements 812, 814. However, when an end user is dragging a slider such as slider 826 within node display element 812 using a mouse (represented by mouse pointer 828), the end user may inadvertently traverse the link to node display element 814 when the end user actually desires to continue dragging to the end of node display element 812. This may occur, for example, if the mouse pointer's movement has a greater degree of horizontal movement than the movement of the slider, since the slider is constrained to move within the node display element during a bounded drag. Once the boundary is hit, a computer system may consider the additional horizontal movement to represent a desire to traverse the link, and therefore navigate to node display element 814.

User interface components consistent with the invention may therefore incorporate elastic boundaries between multiple display elements that require an end user to "punch through" the boundaries before the boundaries are crossed. Typically, elastic boundaries are implemented by requiring an end user to manipulate a user control such as a slider display element at least a predetermined distance beyond a boundary coupled to a scroll bar display element before the boundary may be crossed. Predetermined distances may be set for one or both sides of a boundary, and may be different for each side. Moreover, the predetermined distances may be modified by an end user to suit their individual tastes. This may be performed for example, in a Windows-type environment, by setting the distance in a properties dialog box for the active mouse driver.

In addition, predetermined distances may vary depending upon the magnification of the map display, since when the node display elements are represented at higher magnifications, an end user typically has greater relative control over the mouse. Other manners of customizing the predetermined distances, particularly on other platforms, may be used in the alternative.

Figure 36:
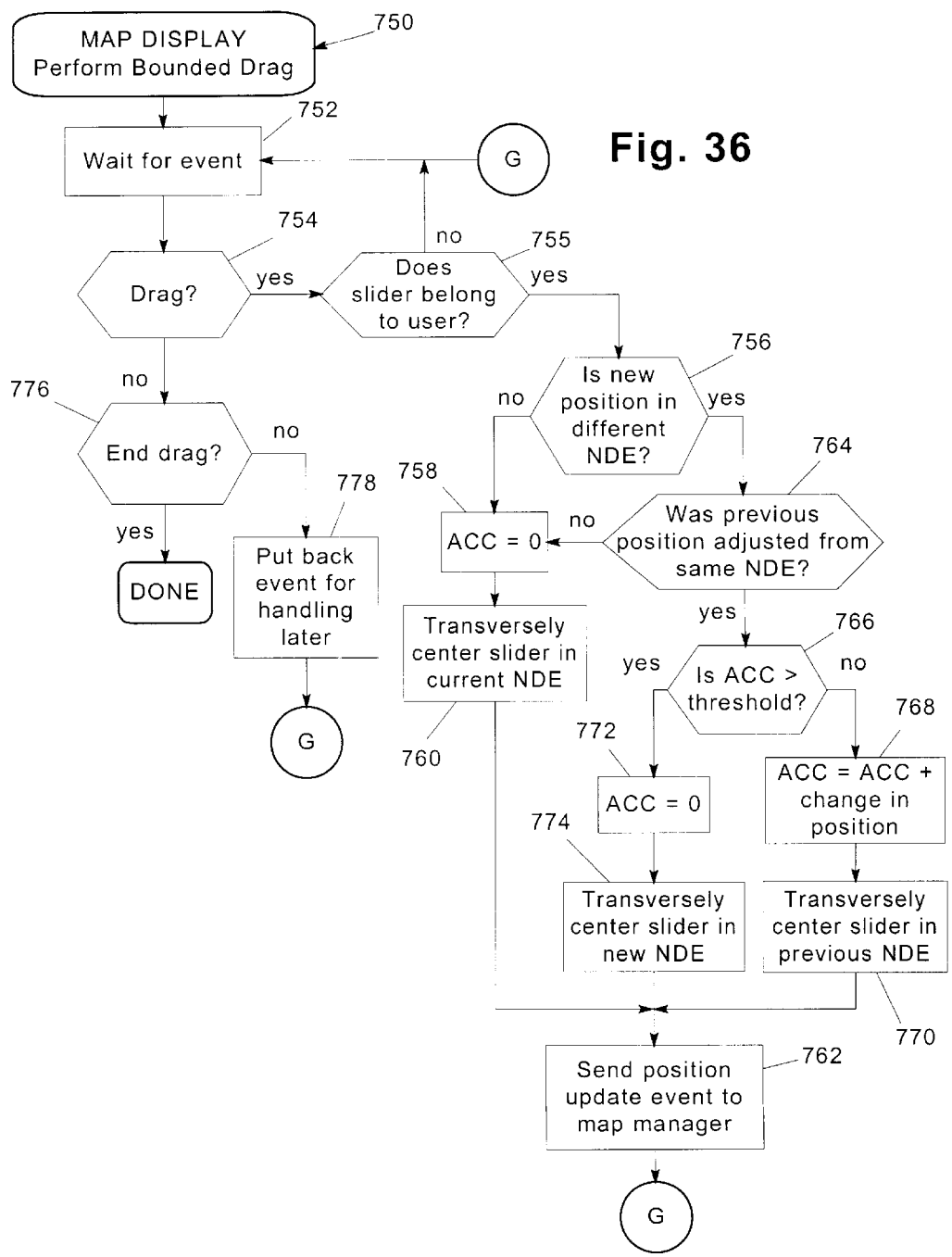
FIG. 36 is a flowchart illustrating the program flow of an alternate perform bounded drag routine to that of FIG. 19, implementing an elastic boundary between node display elements.

One manner of implementing elastic boundaries is illustrated by an alternate perform bounded drag routine 750 in FIG. 36. In this routine, blocks 752, 754, 762, 776 and 778 operate in a similar manner to blocks 450, 451, 458, 460 and 462 of routine 264 in FIG. 19, and therefore will not be discussed in greater detail herein.

Routine 750 differs from routine 264, however, in the manner in which the drag event is handled. First, block 755 determines whether the slider belongs to the user. If not, the drag event is disregarded and control returns to block 752.

However, if the slider does belong to the user, block 756 determines whether the new position of a slider is in a different node display element than the current node display element. If not, an accumulated position variable, ACC is cleared in block 758, the slider is transversely centered in the current node display element at block 760, before passing control to block 762 to update the map display.

If, however, the slider is in a different node display element, control is passed to block 764 to determine whether the previous position of the slider was adjusted from the same node display element as that of the new position of the slider—that is, whether the end user is still trying to cross a boundary into the same node display element as the last drag event. If not, the end user has abandoned the attempt to cross the boundary, so control passes to blocks 758–762 to clear the ACC variable, center the slider in the current node display element, and update the map display.

If, however, the end user is still attempting to cross the boundary into the same node display element, block 764 passes control to block 766 to determine if the ACC variable has exceeded the threshold, which is the predetermined distance that must be exceeded to cross the elastic boundary in the given direction. If so, control passes to block 772 to clear the accumulator. Next, in block 774, the slider is transversely centered in the new node display element, and control is passed to block 762 to update the map display. It should be appreciated that, when the display is updated, the link to the new node display element is traversed by the map manager by virtue of the slider being disposed within the new node display element at the completion of the drag event handler in the map display.

Returning to block 766, if the threshold has not yet been exceeded, control passes to block 768 to accumulate in the ACC variable the incremental change in position of the slider since the last drag event. It should be appreciated that the change in position may be taken along different axes depending upon the boundary between display elements. For example, for adjoining-type displays, the change in position may be taken as the movement of the slider in a direction along the longitudinal axis of target node display element. For internal links within a given node display element or scroll bar display element, the change in position is also generally the direction along the longitudinal axis of the display element. For non-adjoining-type map displays (discussed below with reference to FIG. 38), the change in position may be in the direction along the longitudinal axis of a connector for a link display element.

Next, in block 770, the slider is transversely centered in the previous node display element to provide a "snap" effect—whereby the slider is visually frozen in the previous node display element and does not fully track the mouse pointer. Upon crossing the elastic boundary, the slider snaps from the previous node display element to the new node display element. In the alternative, no snap effect may be provided, whereby the slider follows the mouse pointer but does not traverse the link until the boundary is crossed. Also, as another alternative, a "ghost" slider, e.g., a grayed out slider or outline of a slider, may be utilized to illustrate the end user's progression across an elastic boundary, while maintaining the actual slider in the previous node display element. Other visual effects may also be provided in the alternative.

Next, control is passed to block 762 to update the map display. It should be appreciated that, as the slider is adjusted back into the previous node display element, the map manager does not yet traverse the link.

Returning to FIG. 35, the operation of bounded drag routine 750 on an exemplary map display is now described. As shown in the figure, forward and backward predetermined distances 818a, 818b for crossing boundary 818 in link display element 817 are represented by dashed lines. It should be appreciated, however, that typically the predetermined distances relate to movement along a longitudinal axis of one or both of node display elements 812, 814 given that the slider is transversely centered within the node display elements during a bounded drag. Thus, the predetermined distances are not actually lines in many embodiments, but rather are particular points on the axes.

Figure 37A:
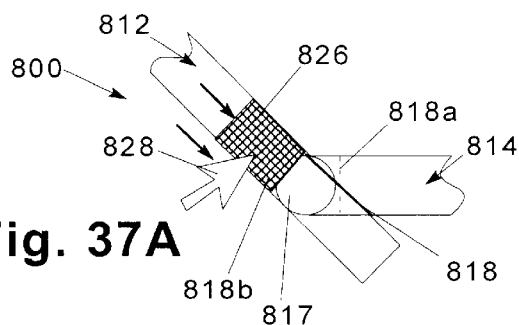
FIGS. 37A–37C are block diagrams illustrating movement of a slider display across an elastic boundary in the map display of FIG. 35.
Figure 37B:
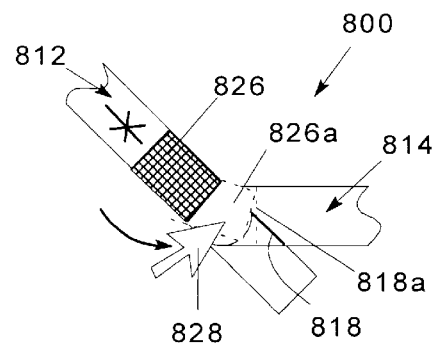
Figure 37C:
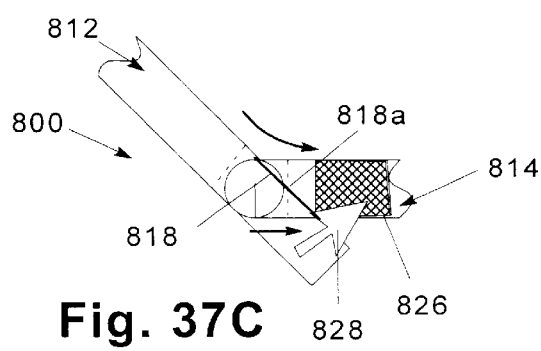

Turning to FIG. 37A, movement of slider 826 in response to dragging the slider with mouse pointer 828 is illustrated. As shown in this figure, slider 826 typically tracks pointer 828 up to reaching boundary 818. However, as shown in FIG. 37B, once the boundary is reached, slider 826 is frozen in node display element 812, while pointer 828 begins to cross boundary 818. An optional ghost slider 826a is also illustrated for explanatory purposes to show the progression of the pointer across the boundary. During this period, the change of position is accumulated in the ACC variable, until such time as the change in position equals the predetermined distance (illustrated where the ghost slider begins to abut line 818a). Once this predetermined distance is reached, the elastic boundary is considered crossed, and slider 826 snaps onto node display element 814 to traverse the link, as shown in FIG. 37C.

Figure 38:
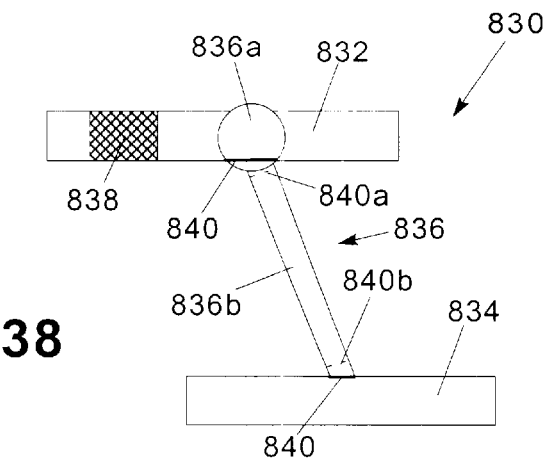
FIG. 38 is a block diagram illustrating elastic boundaries within a non-adjoining-type map display consistent with the invention.

As discussed above, elastic boundaries may be implemented in any number of user interface components including at least one scroll bar display element and a boundary, whether internal or external, coupled thereto. For example, FIG. 38 illustrates a non-adjoining-type map display 830 having first and second node display elements 832, 834 joined by a link display element 836 having a link marker 836a and connector 836b. In this instance, the link display element itself defines the boundary 840 between the node display elements (shown at each end thereof). In this embodiment, the predetermined distance represents the distance along connector 836b that slider 838 must travel from a given node display element. For example, to traverse the link from node display element 832 to node display element 834, the predetermined distance is represented at line 840a. For traversing the link in the opposite direction, the predetermined distance is represented at line 840b.

When the elastic boundary is crossed, slider 838 may be controlled to instantly snap onto the new node display element in this embodiment, or alternately, the slider may be animated to move along connector 836b to represent the traversal. In the alternative, the elastic boundary may be selected to be proximate the midpoint of connector 836b, with predetermined distances defined on either side thereof, whereby the end user actually drags the slider across connector 836b to traverse a link.

As shown in FIGS. 39A–39D, an elastic boundary may be provided solely within internal links (e.g., link 855) represented on a scroll bar display element 850. The scroll bar display element may be wholly independent from any map display, and may simply be a conventional type scroll bar provided on a conventional window user interface component to scroll through the contents of the window. In this embodiment, the link may be an internal hypertext link, or may be a system generated link, e.g., between pages, screens, chapters, sections, etc.

For example, a word processing application may define page breaks between pages, and represent such breaks as internal links on scroll bar display element 850. It should be appreciated that, particularly in a page view, it oftentimes can be difficult to scroll to a given position proximate the beginning or end of a page since the unused white space beyond the top and bottom margins is displayed. By providing elastic boundaries between page breaks, navigation between pages is greatly simplified.

Figure 39A:
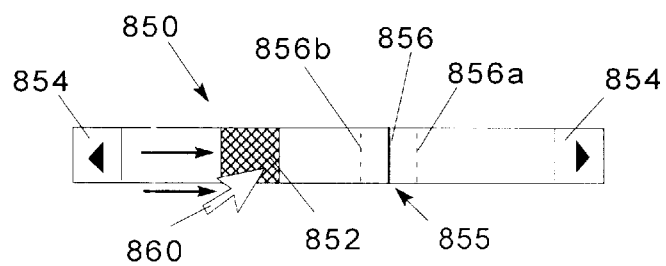
FIGS. 39A–39D are block diagrams illustrating movement of a slider display element along a scroll bar display element having elastic boundaries.

As shown in FIG. 39A, scroll bar display element 850 includes a user control or slider 852 that is movable along the longitudinal axis of the display element to scroll the contents of an associated window for the display component, whether the scroll bar display component is displayed in the same window as the contents, in a different pane or panel within the same window, or in an entirely different window, among others. In addition, other scroll bar controls, such as arrow buttons 854 for line-by-line scrolling, or the regions between buttons 854 and slider 852 for page-by-page or screen-by-screen scrolling, may also be utilized.

Figure 39B:
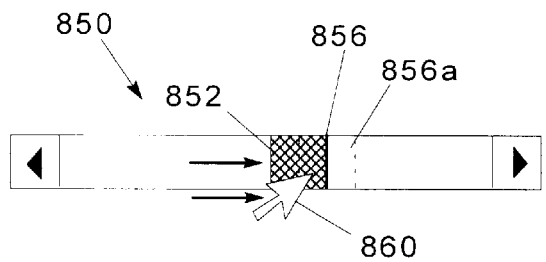
Figure 39C:
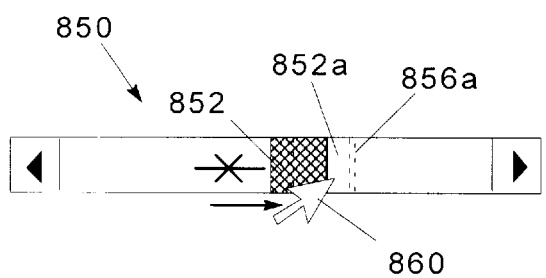
Figure 39D:
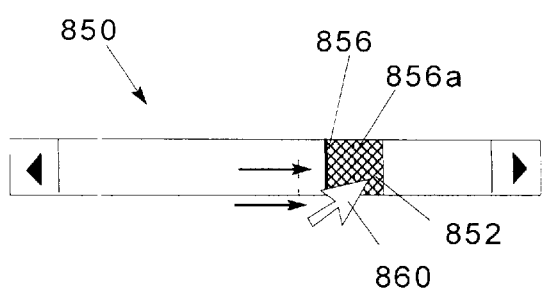

An internal link 855 is represented at boundary 856. Predetermined distances in each direction of the boundary are defined by lines 856a and 856b. As slider 852 is dragged toward boundary 856 by mouse pointer 860, the slider tracks the pointer until such time as the slider hits boundary 856, as illustrated in FIG. 39B. As shown in FIG. 39C, as the pointer continues to move across the boundary, slider 852 is frozen at the boundary, although an optional ghost slider 852a may also be represented on the scroll bar display element. Then, as shown in FIG. 39D, once the pointer has moved the predetermined distance, slider 852 jumps across the boundary to traverse the link. Traversal in the opposite direction occurs in a similar manner.

A number of modifications and additional features may also be implemented in conjunction with the elastic boundaries consistent with the invention. For example, as shown in FIG. 35, it may be desirable to utilize a separate zoom window 804 that is separate from the main window 802 representing map display 800. The zoom window would have the benefit of facilitating more controlled navigation through larger map displays. The zoom window may continuously center on the current node display element. Moreover, the zoom window may be provided as another panel in the same window as map display 800, or may even be implemented by magnifying the current node display element and any node display elements linked thereto relative to other node display elements in the map display, within the same panel of the same window as is used to represent the map display.

An end user may select the zoom option, e.g., through clicking on a node with the mouse or in combination with depressing a control key, or through enabling a zoom mode that is continuously displayed. In the alternative, a zoom option may be enabled by virtue of a node display element having focus (i.e., where the slider is disposed in the node display element) for a predetermined period of time. The magnification may also be increased in conjunction as the focus time increases, and decreased as the slider moves onto a different node display element.

Other routines may be utilized to implement elastic boundaries consistent with the invention. Moreover additional modifications may be utilized in conjunction with the elastic boundaries.

Therefore, it should be appreciated that the invention provides significant advantages over conventional user interface mechanisms. Moreover, it should be appreciated that various additional modifications may be made to the embodiments described herein without departing from the spirit and scope of the invention. Accordingly, the invention lies solely in the claims hereinafter appended.

What is claimed is:

1. A method of graphically representing on a computer display a plurality of linked records, the method comprising:
   (a) displaying a plurality of node display elements, wherein each of which is associated with a record, and wherein at least a pair of node display elements are respectively associated with a pair of records that are linked to one another, the pair of node display elements graphically linked with one another; and
   (b) indicating on each node display element a cache status of its associated record.

2. The method of claim 1, wherein indicating the cache status includes displaying a cache status indicator on each node display element, the cache status indicator selected from the group consisting of a color indicator, a pattern indicator, a border indicator, an icon indicator, an alphanumeric indicator, and combinations thereof.

3. The method of claim 2, wherein the status indicator includes a solid border for node display elements associated with cached records, and a dashed border for node display elements associated with non-cached records.

4. The method of claim 2, further comprising retrieving a non-cached record in response to user selection of the node display element associated with the non-cached record.

5. The method of claim 4, further comprising caching out a cached record in response to user selection of the node display element associated with the cached record.

6. The method of claim 5, further comprising displaying a selected status indicator on each node display element, the selected status indicator visually representing whether each node display element has been selected by an end user.

7. The method of claim 6, further comprising:
   (a) in response to user selection of a plurality of selected node display elements, setting the selected status indicators thereof to indicate that the plurality of selected node display elements have been selected by an end user; and
   (b) selectively retrieving or caching out as a group the records associated with the plurality of selected node display elements.

8. The method of claim 7, wherein setting the selected status indicators includes setting the selected status indicators for descendant node display elements in response to user selection of a parent node display element.

9. The method of claim 4, further comprising:
   (a) displaying a link display element graphically linking the node display element associated with the non-cached record to a node display element associated with a parent record thereto; and
   (b) displaying a retrieve progress indicator during retrieval of the non-cached record, the retrieve progress indicator graphically linked to one of the link display element and the node display elements associated with the non-cached and parent records.

10. The method of claim 9, wherein the node display elements associated with the parent and non-cached records are non-adjoining, wherein the link display element includes a connector display element extending between the node display elements associated with the parent and non-cached records, and wherein displaying the retrieve progress indicator is animated to traverse the connector display element from proximate the node display element associated with the parent record to proximate the node display element associated with the non-cached record.

11. The method of claim 9, wherein the node display elements associated with the parent and non-cached records are adjoining, and wherein displaying the retrieve progress indicator is animated to traverse between opposing ends of the node display element associated with the non-cached record.

12. The method of claim 9, wherein indicating the cache status further includes toggling the cache status indicator for the node display element associated with the non-cached record upon completion of retrieval of the non-cached record to indicate the cached status thereof.

13. A user interface component for use in displaying on a computer display a graphical representation of a plurality of linked records, the user interface component comprising:

(a) a plurality of node display elements, wherein each of which is associated with a record, and wherein at least a pair of node display elements are respectively associated with a pair of records that are linked to one another, the pair of node display elements graphically linked with one another; and (b) a cache status indicator configured to indicate for each node display element a cache status of its associated record.

14. A computer system configured to display a graphic representation of a plurality of linked records, the computer system comprising:

(a) a computer display; and (b) a processor configured to display on the computer display a plurality of node display elements, wherein each of which is associated with a record, and wherein at least a pair of node display elements are respectively associated with a pair of records that are linked to one another, the pair of node display elements graphically linked with one another; and to indicate on each node display element a cache status of its associated record.

15. A program product comprising:

(a) a program configured to perform a method of graphically representing on a computer display a plurality of linked records, the method comprising displaying a plurality of node display elements, wherein each of which is associated with a record, and wherein at least a pair of node display elements are respectively associated with a pair of records that are linked to one another, the pair of node display elements graphically linked with one another; and indicating on each node display element a cache status of its associated record; and (b) a signal bearing media bearing the program.

16. The program product of claim 15, wherein the signal bearing media is transmission type media.

17. The program product of claim 15, wherein the signal bearing media is recordable media.

18. A method of graphically representing on a computer display a plurality of linked records including first and second records, wherein the first record includes a link to the second record, the method comprising:

(a) displaying first and second node display elements, the first and second node display elements respectively associated with the first and second records;

(b) displaying a link display element that graphically links the first and second node display elements; and (c) during a retrieve operation for one of the first and second records, indicating, on a retrieve progress display element visually associated with at least one of the node and link display elements, a current status of the retrieve operation.

19. The method of claim 18, wherein the first and second node display elements are non-adjoining, and wherein the link display element includes a connector display element extending between the first and second node display elements.

20. The method of claim 19, wherein the retrieve progress display element is coupled to the connector display element, and wherein indicating the current status of a retrieve operation for the second record includes animating the retrieve progress display element to traverse the connector display element from proximate the first node display element to proximate the second node display element.

21. The method of claim 20, wherein indicating the current status of a retrieve operation for the first record includes animating the retrieve progress display element to traverse the connector display element from proximate the second node display element to proximate the first node display element.

22. The method of claim 20, wherein the retrieve progress display element includes a bar fixed at an end thereof proximate the first node display element and which is animated at an opposing end to expand toward the second node display element.

23. The method of claim 20, wherein the retrieve progress display element includes a slider having a fixed length that is animated to slide along the connector display element toward the second node display element.

24. The method of claim 18, wherein the first and second node display elements are adjoining.

25. The method of claim 24, wherein indicating the current status of a retrieve operation for the second record includes animating the retrieve progress display element to fill in the second node display element.

26. The method of claim 25, wherein animating the retrieve progress display element includes progressively filling in the second node display element from one end thereof to an opposing end thereof.

27. The method of claim 24, wherein the link display element includes a link marker display element proximate where the first and second node display elements meet, and wherein indicating the current status of a retrieve operation for the second record includes animating the retrieve progress display element to fill in the link marker display element.

28. The method of claim 18, further comprising displaying an alphanumeric indication of the current status of the retrieve operation.

29. The method of claim 18, further comprising, in response to user input, terminating the retrieve operation when the retrieve progress display element indicates a stalled retrieve operation.

30. The method of claim 18, further comprising indicating a cache status for each node display element, including toggling a cache status indicator for the second node display element upon completion of retrieval of the second record.

31. A user interface component configured to display on a computer display a graphic representation of a plurality of records including first and second records, wherein the first record includes a link to the second record, the user interface component comprising:

(a) first and second node display elements, the first and second node display elements respectively associated with the first and second records;

(b) a link display element that graphically links the first and second node display elements; and (c) a retrieve progress display element visually associated with at least one of the node and link display elements, the retrieve progress display element indicating, during a retrieve operation for one of the first and second records, a current status of the retrieve operation.

32. A computer system configured to display a graphic representation of a plurality of linked records including first and second records, wherein the first record includes a link to the second record, the computer system comprising:

(a) a computer display; and (b) a processor configured to display on the computer display first and second node display elements respectively associated with the first and second records, and a link display element that graphically links the first and second node display elements; and, during a retrieve operation for one of the first and second records, to indicate a current status of the retrieve operation on a retrieve progress display element visually associated with at least one of the node and link display elements.

33. A program product comprising:

(a) a program configured to perform a method of graphically representing on a computer display a plurality of linked records including first and second records, wherein the first record includes a link to the second record, the method comprising displaying first and second node display elements, the first and second node display elements respectively associated with the first and second records; displaying a link display element that graphically links the first and second node display elements; and during a retrieve operation for one of the first and second records, indicating, on a retrieve progress display element visually associated with at least one of the node and link display elements, a current status of the retrieve operation; and (b) a signal bearing media bearing the program.

34. The program product of claim 33, wherein the signal bearing media is transmission type media.

35. The program product of claim 33, wherein the signal bearing media is recordable media.

* * * * *